United States Patent
Kanzaki

(10) Patent No.: US 11,977,792 B2
(45) Date of Patent: May 7, 2024

(54) PRINTING APPARATUS, METHOD FOR CONTROLLING PRINTING APPARATUS, AND COMPUTER-READABLE STORAGE MEDIUM

(71) Applicant: Brother Kogyo Kabushiki Kaisha, Nagoya (JP)

(72) Inventor: Takashi Kanzaki, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/150,273

(22) Filed: Jan. 5, 2023

(65) Prior Publication Data
US 2023/0273754 A1    Aug. 31, 2023

(30) Foreign Application Priority Data
Jan. 31, 2022    (JP) ................ 2022-013432

(51) Int. Cl.
*G06F 3/12*    (2006.01)
*G06K 15/10*   (2006.01)

(52) U.S. Cl.
CPC .......... *G06F 3/1208* (2013.01); *G06F 3/1256* (2013.01); *G06K 15/102* (2013.01)

(58) Field of Classification Search
CPC .... G06F 3/1208; G06F 3/1256; G06F 3/1285; G06K 15/102; H04N 1/6058; H04N 1/54
See application file for complete search history.

(56) References Cited

U.S. PATENT DOCUMENTS

| | | | |
|---|---|---|---|
| 2008/0112025 A1 | 5/2008 | Kishimoto | |
| 2011/0304866 A1* | 12/2011 | Sawada | G06F 3/1211 358/1.9 |
| 2019/0258437 A1* | 8/2019 | Chauvin | G06F 3/1288 |
| 2020/0036862 A1* | 1/2020 | Hoshii | H04N 1/0455 |

FOREIGN PATENT DOCUMENTS

| | | |
|---|---|---|
| JP | 2008-123291 A | 5/2008 |
| JP | 2016-163129 A | 9/2016 |

* cited by examiner

*Primary Examiner* — Iriana Cruz
(74) *Attorney, Agent, or Firm* — Merchant & Gould P.C.

(57) ABSTRACT

A printing apparatus having a head having first nozzles for inks in basic colors and second nozzles for an ink in a custom color, first flow paths for supplying the inks to the first nozzles, a second flow path for supplying the ink to the second nozzles, a display, and a controller, is provided. The controller is configured to acquire an imaging color gamut in a predetermined color space including color values included in image data, for each of a plurality of option colors, one of which is selectable as the custom color, acquire a printing color gamut, acquire an evaluation value for each of the option colors based on a comparison between the printing color gamut and the imaging color gamut, and before loading the second flow path with the ink in the custom color, display a ranked order of the option colors based on the evaluation values.

15 Claims, 29 Drawing Sheets

| Option Color | Evaluation Value | Ranked Order | First Part |
|---|---|---|---|
| Red | 100% | 1 | N |
| Green | 95% | 2 | Y |

Show Detail
Show Detail

FIG. 16

PRINTING APPARATUS, METHOD FOR CONTROLLING PRINTING APPARATUS, AND COMPUTER-READABLE STORAGE MEDIUM

REFERENCE TO RELATED APPLICATIONS

This application claims priority from Japanese Patent Application No. 2022-013432 filed on Jan. 31, 2022. The entire content of the priority application is incorporated herein by reference.

BACKGROUND ART

The present disclosure is related to a printing apparatus, a method for controlling the printing apparatus, and a computer-readable storage medium therefor.

A color processing apparatus is known. The color processing apparatus may acquire an evaluation value indicating a gap between an imaging color value in image data composing an image and a predetermined gamut provided to an output apparatus that may output the image. The color processing apparatus may, when the acquired evaluation value is greater than a predetermined threshold value, convert the imaging color value to an outputting color value so that the imaging color value may stay within the gamut of the output apparatus. Meanwhile, the color processing apparatus may, when the acquired evaluation value is smaller than or equal to the predetermined threshold value, receive the imaging color value as the outputting color value without converting. The color processing apparatus may create a color profile, in which each of the imaging color values and each of the outputting color values are linked, and execute color-converting processes based on the created color profile.

DESCRIPTION

Thus, the known color processing apparatus may evaluate the gaps between the imaging color values and the predetermined gamut provided to the output apparatus and convert the colors based on the evaluation values. However, there may be cases that the output apparatus may not reproduce the input colors within the given predetermined gamut. Therefore, to those colors, the output apparatus may apply custom colors different from the given gamut. In such occasions, there may be demands for techniques to select a suitable custom color that may improve reproducibility of images.

The present disclosure is advantageous in that a printing apparatus, a method for controlling the printing apparatus, and a computer-readable storage medium for controlling the printing apparatus, by which reproducibility of images may be improved with use of a custom color, are provided.

FIG. 16 is a chart to be displayed in the display showing results of determinations made in the controlling flow shown in FIG. 13.

<Configuration of Printing Apparatus>

Figure 1:
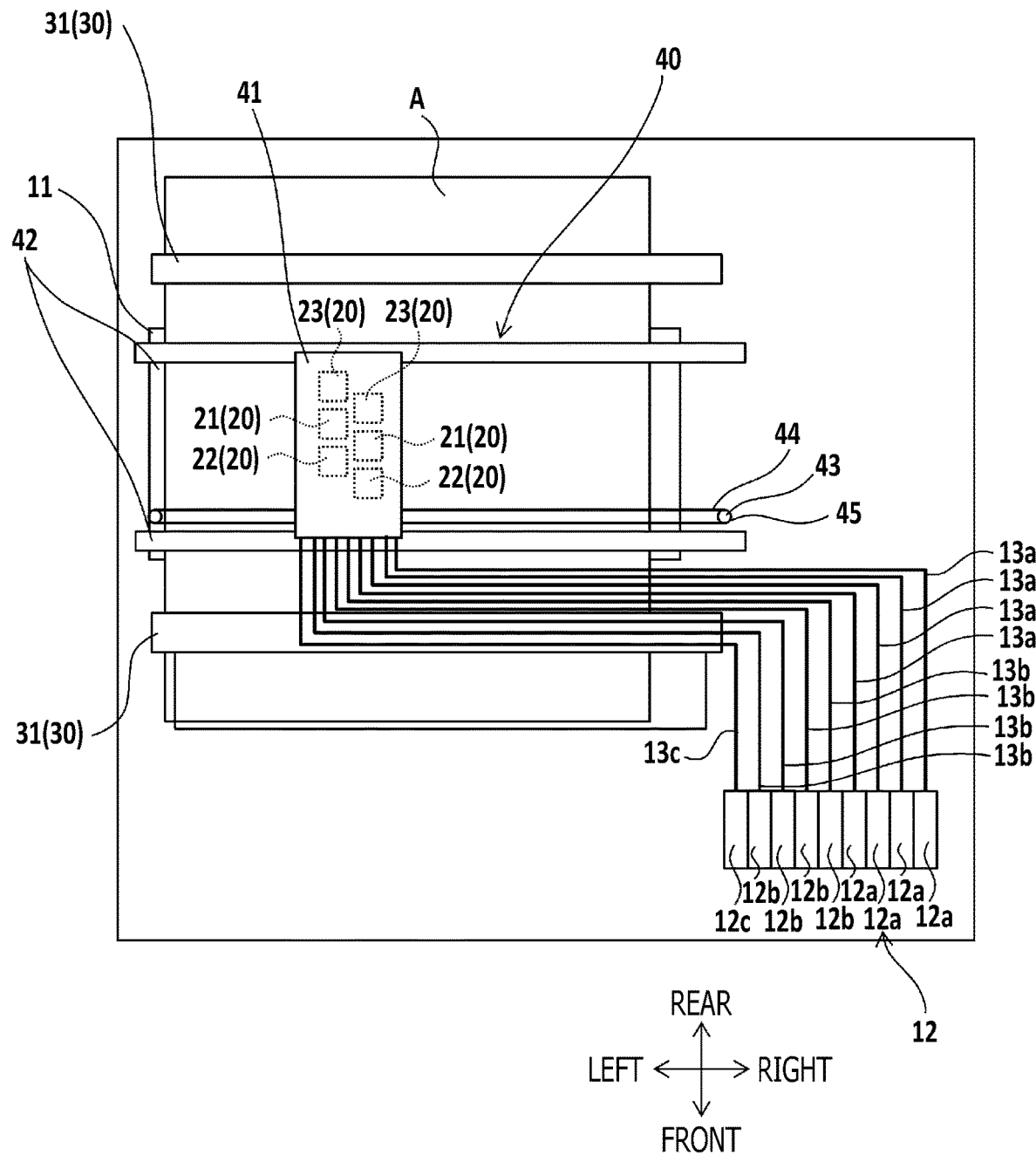
FIG. 1 is a schematic top plan view of a printing apparatus.

A printing apparatus 10 according to an embodiment of the present disclosure is, as shown in FIG. 1, a printer that may operate heads 20 to discharge inks through nozzles 24 (see FIG. 2) at a printing medium A to print an image C in the inks on the printing medium A. In other words, the printing apparatus 10 may be an inkjet printer. However, the printing apparatus 10 may not necessarily be limited to an inkjet printer. The printing medium A may be, for example, a sheet of paper or fabric.

The printing apparatus 10 is a printer in a serial-head style having a plurality of heads 20, a platen 11, a plurality of tanks 12, a conveyer 30 and a movable device 40. In the description below, a first direction, in which the printing medium A may be conveyed by the conveyer 30 on the platen 11, will be called "front-rear direction." A second direction intersecting, for example, orthogonally, with the first direction will be called "widthwise direction." A direction intersecting, for example, orthogonally, with the first direction and the second direction, will be called "vertical direction." However, orientation of the printing apparatus 1 may not necessarily be limited to the orientation mentioned herein. Optionally, the printing apparatus 10 may be a printer in a line-head style. When the printing apparatus 10 is the line-head styled printer, the printing apparatus 10 may not have the movable device 40, but the heads 20 may stay in one place and have a length greater than a printable area in the printing medium A.

The plurality of heads 20 include a first head 21, a second head 22, and a third head 23. The heads 20 are in an arrangement such that downward surfaces thereof face the platen 11. The platen 11 has a substantially flat upper surface and defines a distance between the printing medium A placed on the upper surface and the downward surfaces of heads 20 in the vertical direction. The tanks 12 are containers to store the inks. A number of the tanks 12 is equal to or larger than a number of types of the ink. For example, the tanks 12 may include four (4) first tanks 12a, one or more second tanks 12b, and one or more third tanks 12c. The first tanks 12a may store inks in four basic colors, the second tank(s) 12b may store ink(s) in custom color(s), the third tank(s) 12c may store ink(s) of foundation color(s).

The inks for the basic colors may be, for example, an ink in cyan, an ink in yellow, an ink in magenta, and an ink in black. The ink(s) in the custom color(s) may include, for example, an ink in red, an ink in green, and an ink in blue, which are colors different from the basic colors. The ink(s) of the foundation color(s) may include, for example, an ink in white.

Each of the first tanks 12a stores the ink in one of the basic colors and is continuous to the first heads 21 through first flow paths 13a. The inks in the basic colors may be supplied from the first tanks 12a through the first flow paths 13a to the first heads 21. Each of the second tanks 12b stores the ink in one of the custom colors and is continuous to the second heads 22 through second flow paths 13b. Once the second tank 12b is loaded with the ink in the custom color, the ink may flow from the second tank 12b through the second flow path 13b and may be supplied to the second head 22. Before the second tank 12b is loaded with the ink in the custom color, the second tank 12b may be filled with preservative solution or liquid different from the ink in the custom color. Each of the third tanks 12c is continuous to the third heads 23 through third flow paths 13c. The ink in the foundation color may be supplied from the third tanks 12c through the third flow path 13c to the third head 23. The first flow paths 13a, the second flow paths 13b, and the third flow path 13c may be made of, for example, rubber tubes or plastic tubes, and may be preferably flexible against bending forces.

Figure 3:
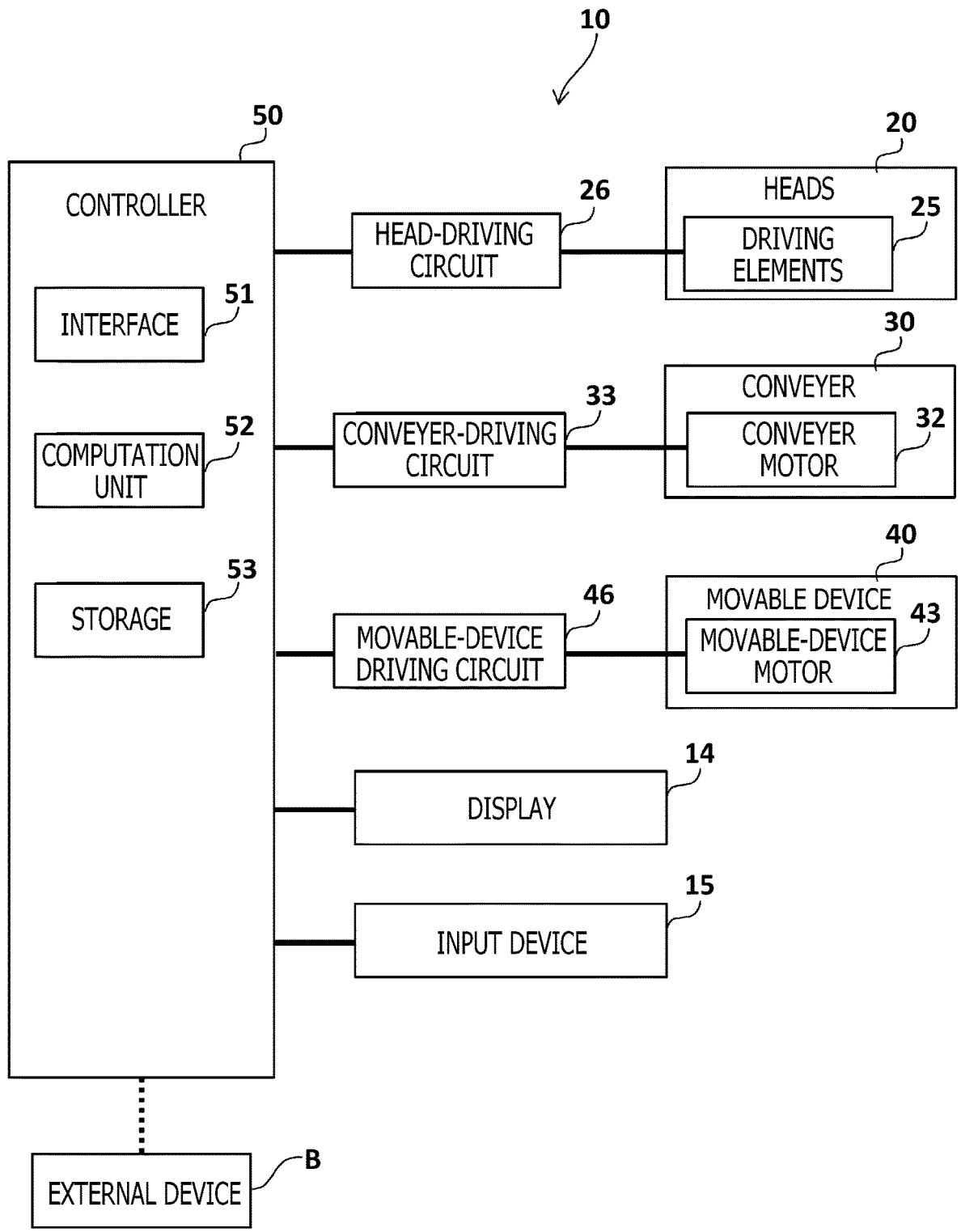
FIG. 3 is a block diagram to illustrate components in the printing apparatus.

The conveyer 30 may include, for example, two (2) pairs of conveyer rollers 31 and a conveyer motor 32 (see FIG. 3). The two pairs of conveyer rollers 31 are arranged on one side and the other side of the platen 11 in the front-rear direction. Each conveyer roller 31 has a shaft extending in the widthwise direction. The conveyer rollers 31 in each pair align in the vertical direction in an arrangement such that the printing medium A may be nipped there-between. One of the paired conveyer rollers 31 is coupled to the conveyer motor 32. The conveyer rollers 31 may be rotated on the shaft thereof by a driving force from the conveyer motor 32 and convey the printing medium A in the front-rear direction over the platen 11.

The movable device 40 includes a carriage 41, two (2) guide rails 42, a movable-device motor 43, and an endless belt 44. The guide rails 42 extends in the widthwise direction at positions above the platen 11. The guide rails 42 are arranged on one side and the other side of the heads 20 in the front-rear direction. The carriage 41 has the heads 20 mounted thereon and is supported by the guide rails 42 movably in the widthwise direction along the guide rails 42. The endless belt 44 longitudinally extends in the widthwise direction and is attached to the carriage 41. The endless belt 44 is coupled to the movable-device motor 43 through a pulley 45. As the movable-device motor 43 drives, the endless belt 44 may circulate, and the carriage 41 may reciprocate in the widthwise direction along the guide rails 42 Thereby, the carriage 41 may carry the heads 20 in the widthwise direction.

<Heads>

Figure 2:
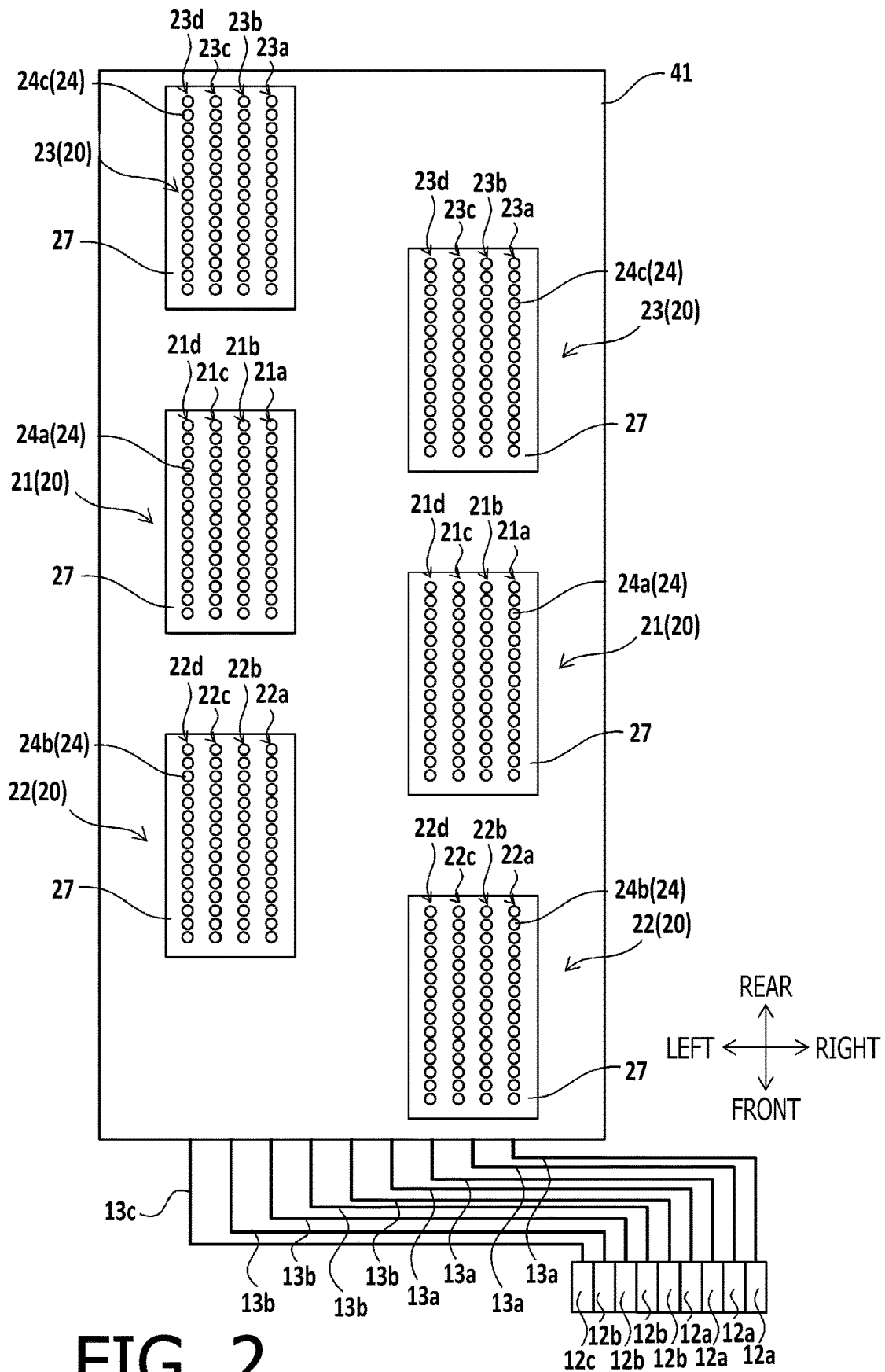
FIG. 2 is a bottom plan view of heads in the printing apparatus.

On the carriage 41, as shown in FIG. 2, the plurality of heads 20 are mounted. The plurality of heads 20 may include, for example, two (2) first heads 21, two (2) second heads 22, and two (2) third heads. The first heads 21 include the first head 21 on the right and the first head 21 on the left. The second heads 22 include the second head 22 on the right and the second head 22 on the left. The third heads 23 include the third head 23 on the right and the third head 23 on the left.

For example, the second head 22 on the right, the first head 21 on the right, and the third head 23 on the right are spaced from one another and align in line along the front-rear direction in this given order from front to rear. The second head 22 on the left, the first head 21 on the left, and the third head 23 on the left are spaced from one another and align in line along the front-rear direction in this given order from front to rear. In the front-rear direction, the first head 21 on the right is located frontward with respect to the first head 21 on the left, the second head 22 on the right is located frontward with respect to the second head 22 on the left, and the third head 23 on the right is located frontward with respect to the third head 23 on the left. In other words, the heads 20 are in an alternately staggered arrangement. However, the arrangement of the first heads 21, the second heads 22, and the third heads 23 may not necessarily be limited to the arrangement described herein.

Each of the heads 20 has a flow-path forming member and a plurality of nozzles 24. The flow-path forming member consists of a plurality of layered plates including a nozzle plate 27. The nozzle plate 27 is a flat piece of plate, and a lower surface thereof forms the lower surface of the head 20. The nozzles 24 are open downward through the lower surface of the nozzle plate 27 being the lower surface of the head 20. The plurality of nozzles 24 include first nozzles 24a in the first heads 21, second nozzles 24b in the second heads 22, and third nozzles 24c in the third heads 23. The nozzles 24 in each head 20 align in the front-rear direction to form a plurality of nozzle lines. The nozzle lines are spaced from one another in the widthwise direction and arranged in parallel with one another along the front-rear direction. Each of the first heads 21 has first nozzle lines 21a-21d, each of the second heads 22 has second nozzle lines 22a-22d, each of the third heads 23 has third nozzle lines 23a-23d.

The first nozzles 24a in the first nozzle lines 21a are continuous with the first tank 12a containing the ink in cyan through the first flow path 13a and may discharge the ink in cyan. The first nozzles 24a in the first nozzle lines 21b are continuous with the first tank 12a containing the ink in magenta through the first flow path 13a and may discharge the ink in magenta. The first nozzles 24a in the first nozzle lines 21c are continuous with the first tank 12a containing the ink in yellow through the first flow path 13a and may discharge the ink in yellow. The first nozzles 24a in the first nozzle lines 21d are continuous with the first tank 12a containing the ink in black through the first flow path 13a and may discharge the ink in black. The third nozzles 24c in the third nozzle lines 23a-23d are continuous with the third tank 12c containing the ink in white through the third flow paths 13c and may discharge the ink in white.

The second nozzles 24b in the second nozzle lines 22a-22d are continuous with the second tank 12b containing the ink in the custom colors through the second flow paths 13b. When the second tanks 12b are loaded with the inks in the custom colors, the inks in the custom colors may be supplied from the second tanks 12b to the second nozzles 24b through the second flow paths 13b, and the second nozzles 24b may discharge the inks in the custom colors. Optionally, the second nozzles 24b in the second nozzle lines 22a, the second nozzles 24b in the second nozzle lines 22b, the second nozzles 24b in the second nozzle lines 22c, and the second nozzle lines 22b in the second nozzle lines 22d may discharge inks in different custom colors. For example, the second nozzles 24b in the second nozzle lines 22a may discharge ink in red, the second nozzles 24b in the second nozzle lines 22b may discharge ink in green, the second nozzles 24b in the second nozzle lines 22c may discharge ink in blue, and the second nozzles 24b in the second nozzle lines 22d may discharge ink in gold. For another example, the second nozzles 24b in the second nozzle lines 22a, the second nozzles 24b in the second nozzle lines 22b, the second nozzles 24b in the second nozzle lines 22c, and the second nozzle lines 22b in the second nozzle lines 22d may discharge ink in a same custom color. In the latter arrangement, the printing apparatus 10 may have the second tank 12b of a single type, and the second nozzles 24b in the second nozzle lines 22a-22d may be continuous with the second tank 12b so that the second nozzles 24b in the second nozzle lines 22a-22d may discharge the same ink therefrom.

As shown in FIG. 3, each head 20 has a plurality of driving elements 25. The driving elements may be, for example, piezoelectric devices, heating devices, and electrostatic actuators. The driving elements are provided to the nozzles 24 on one-on-one basis and may apply pressure that causes the ink in the nozzles 24 to be discharged through the nozzles 24.

<Controller, Display, Input Device>

The printing apparatus 10 includes, as shown in, a display 14, an input device 15, and a controller 50. The controller 50 may be a computer having an interface 51, a computation unit 52, and a storage 53. The interface 51 may receive data including image data transmitted from an external device B including, for example, a computer, a camera, a communication network, a storage medium, a display, and a printer. The image data may be raster data composing an image C to be printed on the printing medium A. Optionally, the controller 50 may be an independent apparatus or may consist of a plurality of distributed devices that cooperate with one another to work as the printing apparatus 10.

The storage 53 is a memory device accessible by the computation unit 52 and includes a RAM and a ROM. The RAM may store data, such as the data received from the external device B and data converted by the computation unit 52, temporarily. The ROM may store computer programs, which may be used to process the data, and predetermined types of data, including data indicating predetermined correspondences. Optionally, the computer programs may be stored in an external storage medium, which is different from the storage 53 but is accessible to the computation unit 52, such as a CD-ROM.

The computation unit 52 includes at least one circuit such as a processor, e.g., CPU, and an integrated circuit, e.g., ASIC. The computation unit 52 may run the computer programs to control the devices in the printing apparatus 10 and execute operations such as a printing operation in the printing apparatus 10. The operations to be executed in the printing apparatus 10 will be described further below.

The controller 50 is electrically connected with the display 14 and the input device 15. The display 14 may be controlled by the controller 50 to display images such as the image C to be printed in the printing operation. The input device 15 may be, for example, buttons and a mouse, which may be operated by the user to input data to the controller 50. Optionally, the input device 15 may be a touch panel, which is formed integrally with the display 14. Further, optionally, the input device 15 may be the interface 51, through which external information indicating positions in the display 14 may be entered.

Moreover, the controller 50 is electrically connected to a conveyer motor 32 of the conveyer 30 through a conveyer-driving circuit 33 and may control activation of the conveyer motor 32. Thus, the conveyer 30 may be controlled to convey the printing medium A. Furthermore, the controller 50 is electrically connected to the movable-device motor 43 of the movable device 40 through a movable-device driving circuit 46 and may control activation of the movable-device motor 43. Thus, the movable device 40 may be controlled to move the heads 20.

Moreover, the controller 50 is electrically connected to the driving elements 25 though a head-driving circuit 26. The controller 50 may output controlling signals for the driving elements 25 to the head-driving circuit 26, and the head-driving circuit 26 may generate driving signals based on the controlling signals and output to the driving elements 25. The driving elements 25 may be driven according to the driving signals, and the inks may be discharged through the nozzles 24.

<Printing Operation>

The controller 50 in the printing apparatus 10 may acquire the image data composing the image C and execute a printing operation based on the acquired image data. For example, the controller 50 may execute a pass operation, in which the heads 20 are moved rightward or leftward and the inks are discharged from the heads 20 at the printing medium A, and a conveying operation, in which the printing medium A is conveyed frontward. The controller 50 may repeat the pass operation and the conveying operation alternately to execute the printing operation, thereby the image C may be printed in the inks on the printing medium A.

Not only the image C, the printing apparatus 10 may form a layer of foundation on the printing medium A before the image C is printed. In particular, in order for the image C to be printed over the foundation, the controller 50 may acquire an area for forming the foundation from the image data composing the image C. The controller 50 may operate the third heads 23 to discharge the ink in the foundation color through the third nozzles 24c to form the foundation on the printing medium A. Thereafter, the controller 50 may operate the first heads 21 to discharge the inks in the basic color through the first nozzles 24a and the second heads 22 to discharge the ink in the custom color through the second nozzles 24b to form the image C over the foundation. Thus, image C may be printed in the inks in the basic colors and the custom color over the foundation on the printing medium A.

<Control Over Printing Apparatus>

Figure 4:
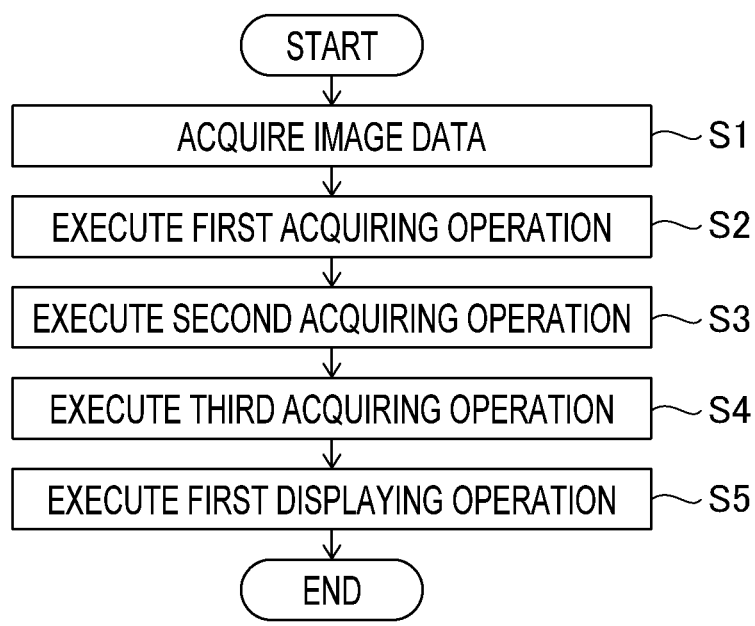
FIG. 4 is a flowchart to illustrate a controlling flow of steps to be executed in the printing apparatus.
Figure 5:
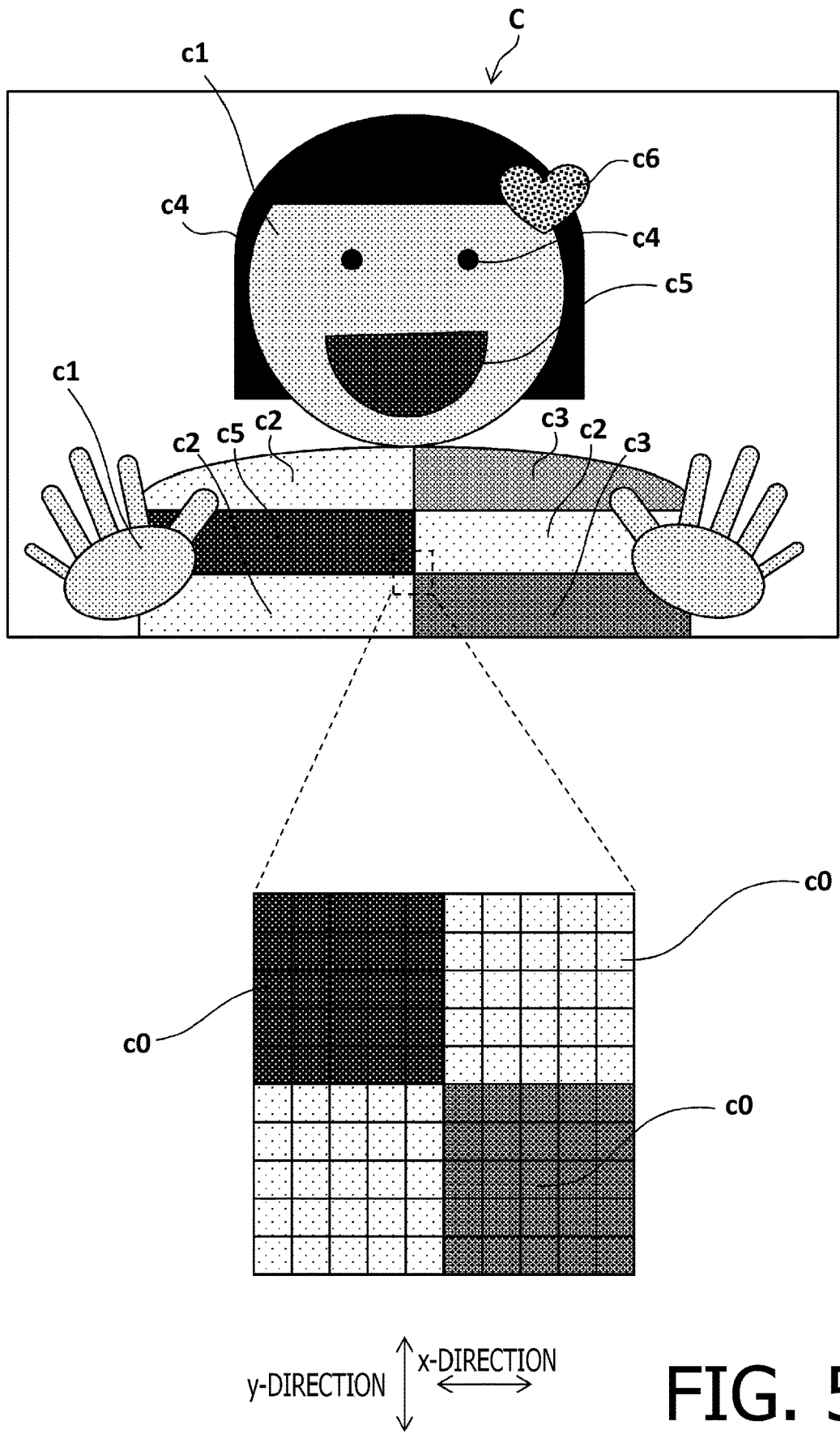
FIG. 5 illustrates an image composed of image data acquired in a first acquiring operation in the controlling flow.

The controller 50 may control the printing apparatus 10 according to a controlling method, for example, as illustrated in a flowchart shown in FIG. 4. For example, the controller 50 may acquire the image data composing the image C, which is usable for printing the image C as shown in FIG. 5, from the external device B (S1). The image C is composed of a plurality of pixels, which are divided into blocks of pixels c0. The image data contains information of color values and positions of the pixels c0. The color values may be expressed in color coordinates in a device-dependent color space such as, for example, RGB values in RGB color space. An RGB value expresses a color by a combination of a red color value, which is in a scale from zero (0) to 255, a green color value, which is in a scale from zero (0) to 255, and a blue color value, which is in a scale from zero (0) to 255.

Next, the controller 50 may execute a first acquiring operation (S2). In particular, the controller 50 acquires an imaging color gamut D in a predetermined color space. The imaging color gamut D is a range, which includes the entire color values included in the image data composing the image C. For example, in the first acquiring operation, the controller 50 may acquire the color values of the pixels c0 in the image C from the image data. The controller 50 may convert the acquired RGB values of the pixels c0 to Lab values based on predetermined correspondence between the RGB values and the Lab values. The Lab values are color values in a device-independent L*a*b color space in Cartesian coordinates where L represents brightness, a represents hue, and b represents saturation.

Figure 6:
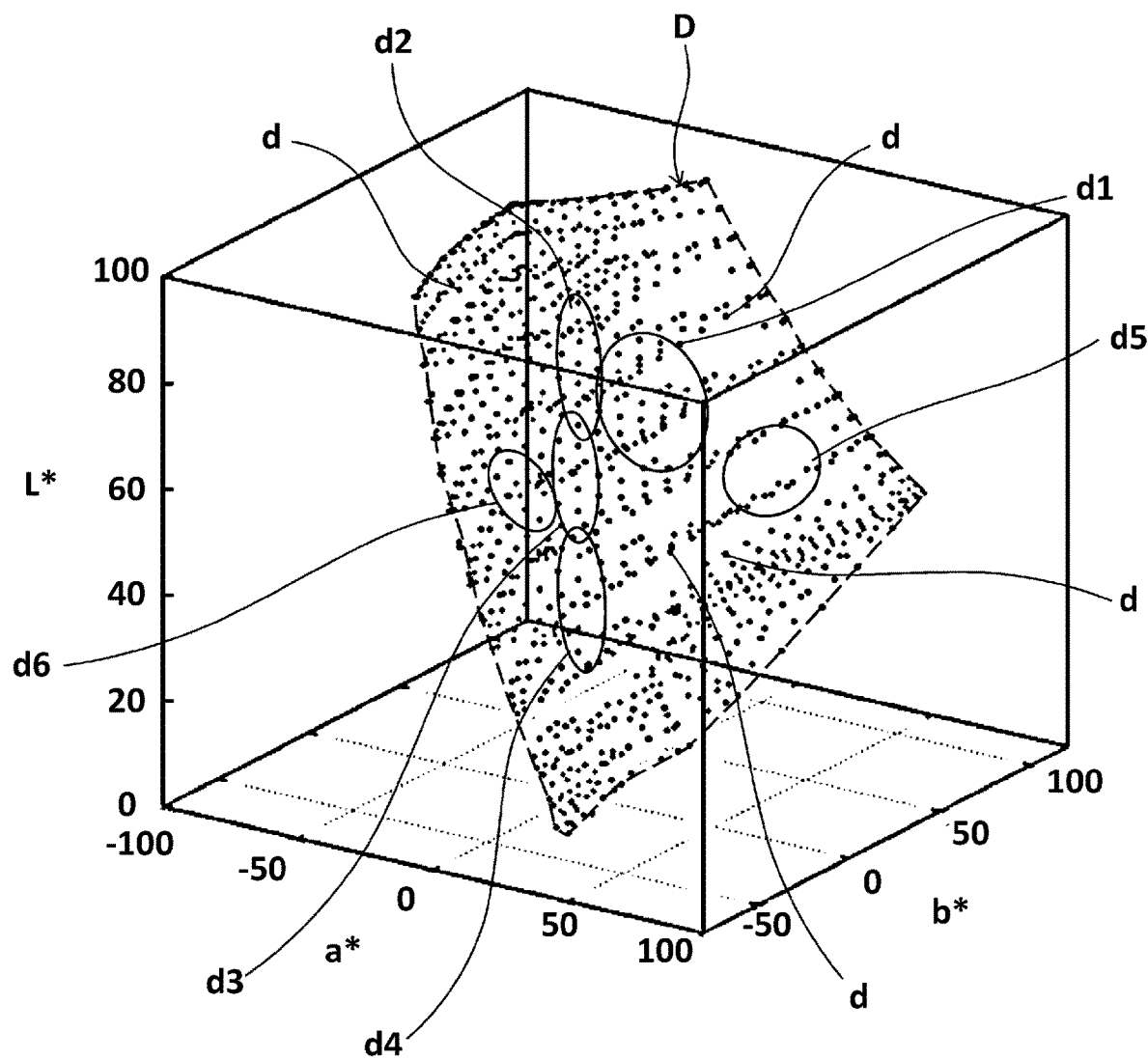
FIG. 6 illustrates an imaging color gamut of the image shown in FIG. 5 expressed in L*a*b* color space.

The controller 50 may, as shown in FIG. 6, draw imaging color values d being the Lab values of the entire pixels c0 included in the image C in the L*a*b* color space. The controller 50 may acquire the range, which includes the Lab values of the entire pixels c0 in the image C, in the L*a*b* color space as the imaging color gamut D. The imaging color gamut D is a closed range and contains the imaging color values d of the entire pixels c0 in the image C.

The image C as shown in FIG. 5 includes parts c1, which are in colors of pale orange, forming a face and hands; parts c2, which are in colors of light gray, forming parts of a garment; parts c3, which are in colors of dark gray, forming another part of the garment; parts c4, which are in colors of black, forming hair and eyes; parts c5, which are in colors of red, forming a mouth and another part of the garment; and a part c6, which is in colors of blue, forming a barrette. Meanwhile, in the L*a*b* color space shown FIG. 6, color gamuts d1-d6 being gamuts of the color values of the parts c1-c6 fall within the imaging color gamut D. The color gamuts d1-d6 may occupy merely smaller ranges in the imaging color gamut D but are used more heavily than the other color values contained in the image C in the imaging color gamut D. Therefore, in the image C, a number of the pixels c0 having the color values in the color gamuts d1-d6 are greater than a number of pixels c0 having the other color values and occupy a large or most part of the image C. For example, ranges for the parts using the color values of the parts c1-c6 in the image C may be substantially equal to the entire area of the image C. Accordingly, even if the colors in the other color values do not appear on a printed outcome, quality of the printed image C may not be affected substantially. In this regard, in the following paragraphs, the imaging color gamut D is considered equally to the color gamuts d1-d6.

Next, the controller 50 may execute a second acquiring operation. In the second acquiring operation, the controller 50 may acquire printing color gamuts Hr, Hg, for the plurality of option colors, from which a custom color is selectable (S3). The printing color gamuts Hr, Hg are color gamuts, which includes color values of the colors printable by the heads 20 in the inks in the option colors and the basic colors, in a predetermined color space.

In the second acquiring operation, the controller 50 may acquire each color value of the of option colors. The option colors are options for the custom color of the inks usable to print the image C. The color values of the option colors may be, for example, input to the controller 50 through the input device 15 and/or the interface 51. For another example, the color values of the option colors may be prepared in the storage 53 in advance, and the controller 50 may acquire the color values of the option colors from the storage 53. For example, a color value of red being one of the option colors may not be stored in the storage 53, but a color value of green being another one of the option colors may be stored in advance in the storage 53. In this case, the controller 50 may acquire the color value of the red from the external device B through the interface 51 and acquire the color value of the green from the storage 53. The color values of the option colors may be, for example, expressed in RGB values or, for another example, CMYK values being coordinates in a device-dependent CMYK color space. A CMYK value expresses a color by a combination of a cyan color value, a magenta color value, a yellow color value, and a black color value, which are in predetermined scales.

Moreover, the controller 50 may acquire the color values of the basic colors from the storage 53. The basic colors are colors usable to print images in the printing apparatus 10 and may include both unmixed plain colors of the inks and mixed colors composed of the colors of the inks. For example, in a case where the printing apparatus 10 is printable with the inks of cyan, magenta, yellow, and black, the basic colors include at least one of these four colors. The basic colors may include both unmixed plain colors of cyan, magenta, yellow, and black, and mixed colors composed of two or more colors of cyan, magenta, yellow, and black. The color values of the basic colors are prepared in the storage 53 in advance and may be, for example, expressed in CMYK values.

For example, in a case where the color values of the option colors and the basic colors are defined in RGB values, the controller 50 may convert the RGB values of the option colors and the basic colors into Lab values based on a predetermined correspondence between the RGB values and the Lab values. For another example, in a case where the color values of the option colors and the basic colors are defined in CMYK values, the controller 50 may convert the CMYK values of the option colors and the basic colors into Lab values based on a predetermined correspondence between the CMYK values and the Lab values.

Figure 7:
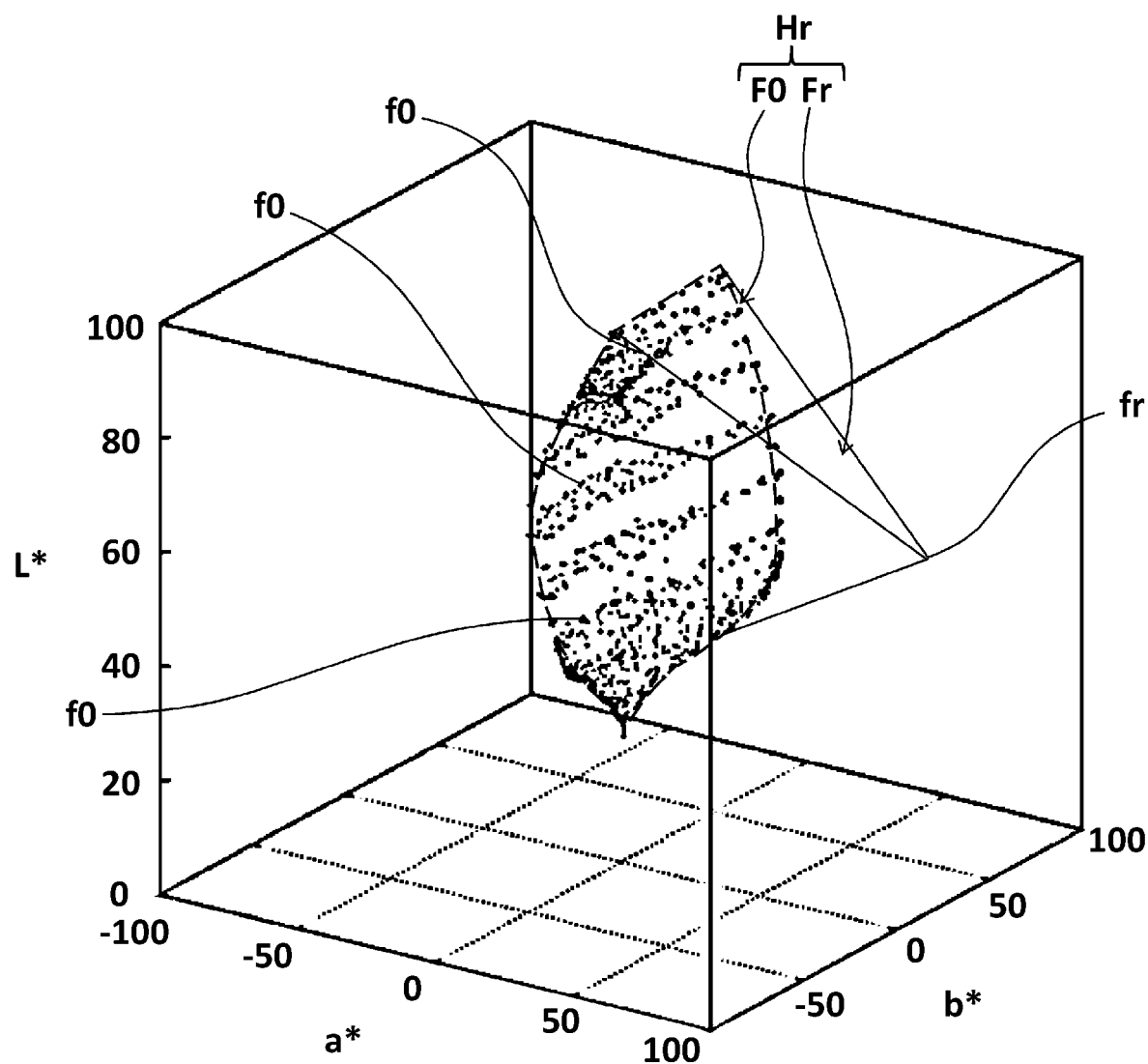
FIG. 7 illustrates a printing color gamut of red expressed in the L*a*b* color space.
Figure 8:
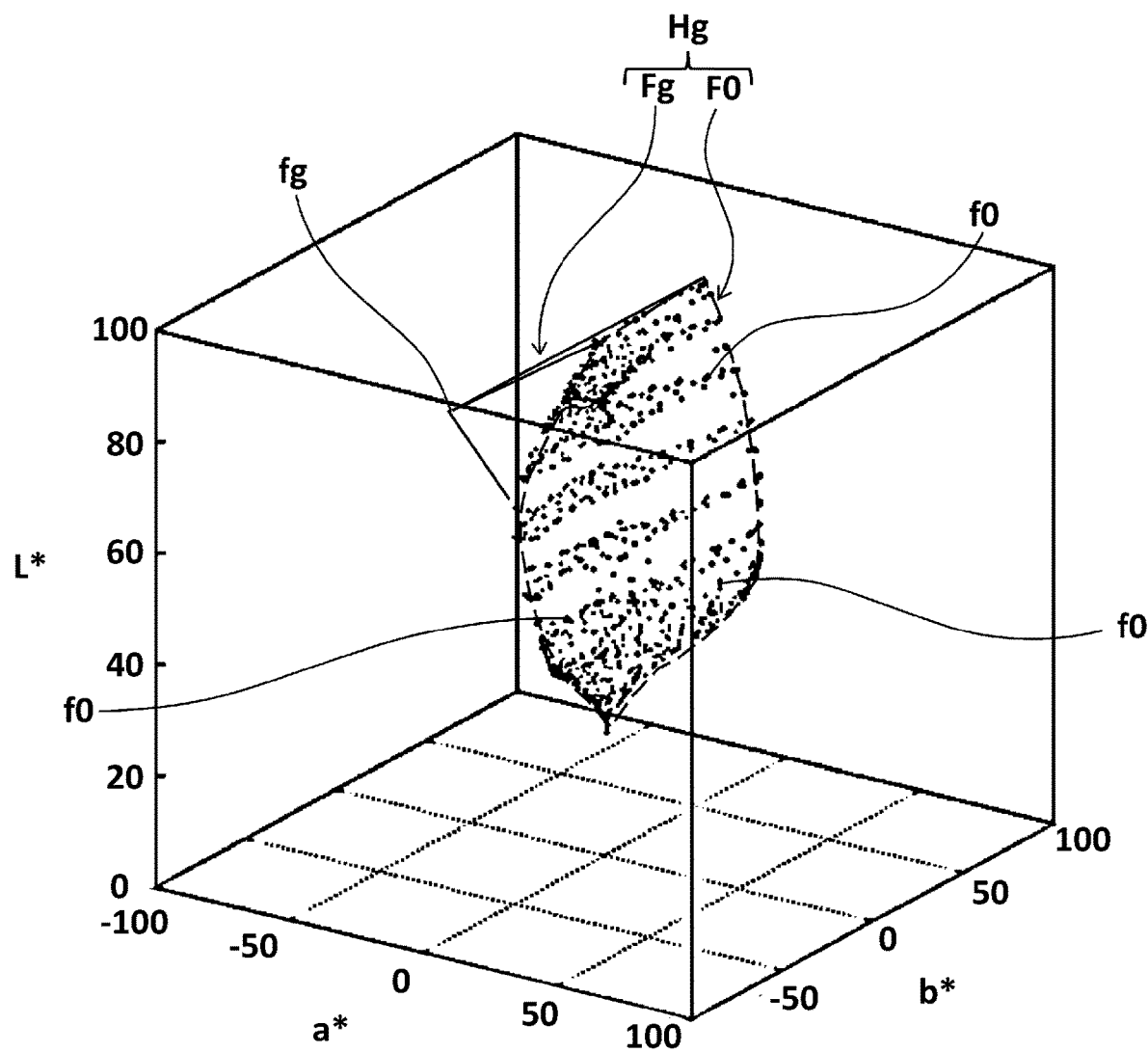
FIG. 8 illustrates a printing color gamut of green expressed in the L*a*b* color space.

The controller 50 may draw, as shown in FIGS. 7 and 8, basic color values f0, which are Lab values of the basic colors, in the L*a*b* color space. The controller 50 may acquire the gamut, which includes the Lab values of the entire basic colors in the L*a*b* color space, as basic color gamut F0. The basic color gamut F0 is a closed range in the L*a*b* color space and contains the entire basic color values f0.

Moreover, the controller 50 may draw, as shown in FIG. 7, an option color value fr, which is a Lab value of the option color red, in the L*a*b* color space. Based on the basic color gamut F0 and the option color value fr, the controller 50 acquires a red-extended color gamut Fr, which is extended from the basic colors by the option color red in the L*a*b* color space. The red-extended color gamut Fr may be, for example, a largest one of spaces among spaces enclosed by the basic color gamut F0 and lines drawn from the option color value fr to the basic color gamut F0. The red-extended color gamut Fr may include the unmixed plain color of the option color red and mixed colors composed of the basic colors and the option color red. The controller 50 acquires a red printing color gamut Hr, in which the basic color gamut F0 and the red-extended color gamut Fr are combined. The red printing color gamut Hr is a gamut, which includes color values of the colors printable by the heads 20 in the inks in the option color red and the basic colors, in a predetermined color space, e.g., the L*a*b* color space.

Moreover, the controller 50 may draw, as shown in FIG. 8, an option color value fg, which is a Lab value of the option color green, in the L*a*b* color space. Based on the basic color gamut F0 and the option color value fg, the controller 50 acquires a green-extended color gamut Fg, which is extended from the basic colors by the option color green in the L*a*b* color space. The green-extended color gamut Fg may be, for example, a largest one of spaces among spaces enclosed by the basic color gamut F0 and lines drawn from the option color value fg to the basic color gamut F0. The green-extended color gamut Fg may include the unmixed plain color of the option color green and mixed colors composed of the basic colors and the option color green. The controller 50 acquires a green printing color gamut Hg, in which the basic color gamut F0 and the green-extended color gamut Fg are combined. The green printing color gamut Hg is a gamut, which includes color values of the colors printable by the heads 20 in the inks in the option color green and the basic colors, in a predetermined color space, e.g., the L*a*b* color space.

Next, the controller 50 may execute a third acquiring operation, in which the controller 50 acquires evaluation values based on a comparison between each of the option colors and the red and green printing color gamuts Hr, Hg (S4). The evaluation values may include, for example, a ratio of an area of the parts of the image C corresponding to the imaging color gamut D that fall within the red and green printing color gamuts Hr, Hg to a total area of the image C.

In particular, in the third acquiring operation, the controller 50 may acquire the imaging color values d of the entire pixels c0 included in the image C and determine whether each of the acquired imaging color values d falls within the red printing color gamut Hr. The controller 50 may acquire a total number Ir of the pixels c0, of which imaging color value d fall within the red printing color gamut Hr, and acquire a ratio Ir/Ic of the total number Ir of the pixel c0 falling within the red printing color gamut Hr to the total number Ic of the pixels c0 included in the image C as an evaluation value.

Figure 9:
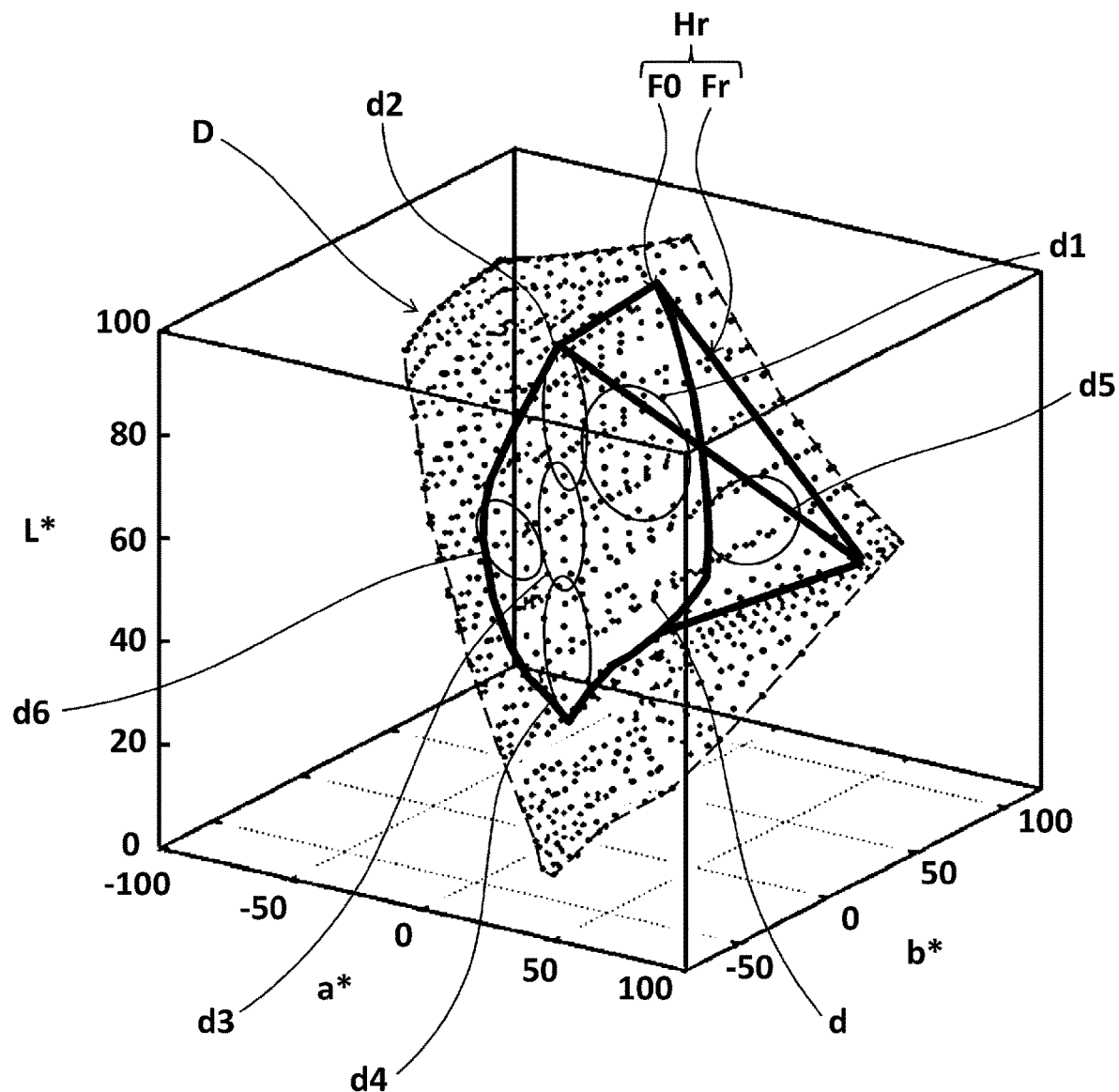
FIG. 9 illustrates the imaging color gamut of the image shown in FIG. 5 and the printing color gamut of red coexisting in the L*a*b* color space.

In the example shown in FIG. 9, the color gamuts d1-d6, which are the gamuts of the color values of the colors included in the parts c1-c6 in the imaging color gamut D in the L*a*b color space, fall within the red printing color gamut Hr. Therefore, substantially all of the pixels c0 among the pixels c0 composing the image C have the imaging color values d that fall within the red printing color gamut Hr. Within the entire area in the image C, the ratio Ir/Ic of the area of the parts corresponding to the imaging color gamut D falling within the red printing color gamut Hr may be substantially 100%. Therefore, the controller 50 may acquire the evaluation value 100%. In this regard, for example, if the option color of red is used as the custom color, the colors in the image C are reproducible in printing in the printing apparatus 10 with use of the inks in the basic colors and the red.

Moreover, in the third acquiring operation, the controller 50 may acquire the imaging color values d of the entire pixels c0 included in the image C and determine whether each of the acquired imaging color values d falls within the green printing color gamut Hg. The controller 50 may acquire a total number Ig of the pixels c0, of which imaging color value d fall within the green printing color gamut Hg, and acquire a ratio Ig/Ic of the total number Ig of the pixel c0 falling within the green printing color gamut Hg to the total number Ic of the pixels c0 included in the image C as an evaluation value.

Figure 10:
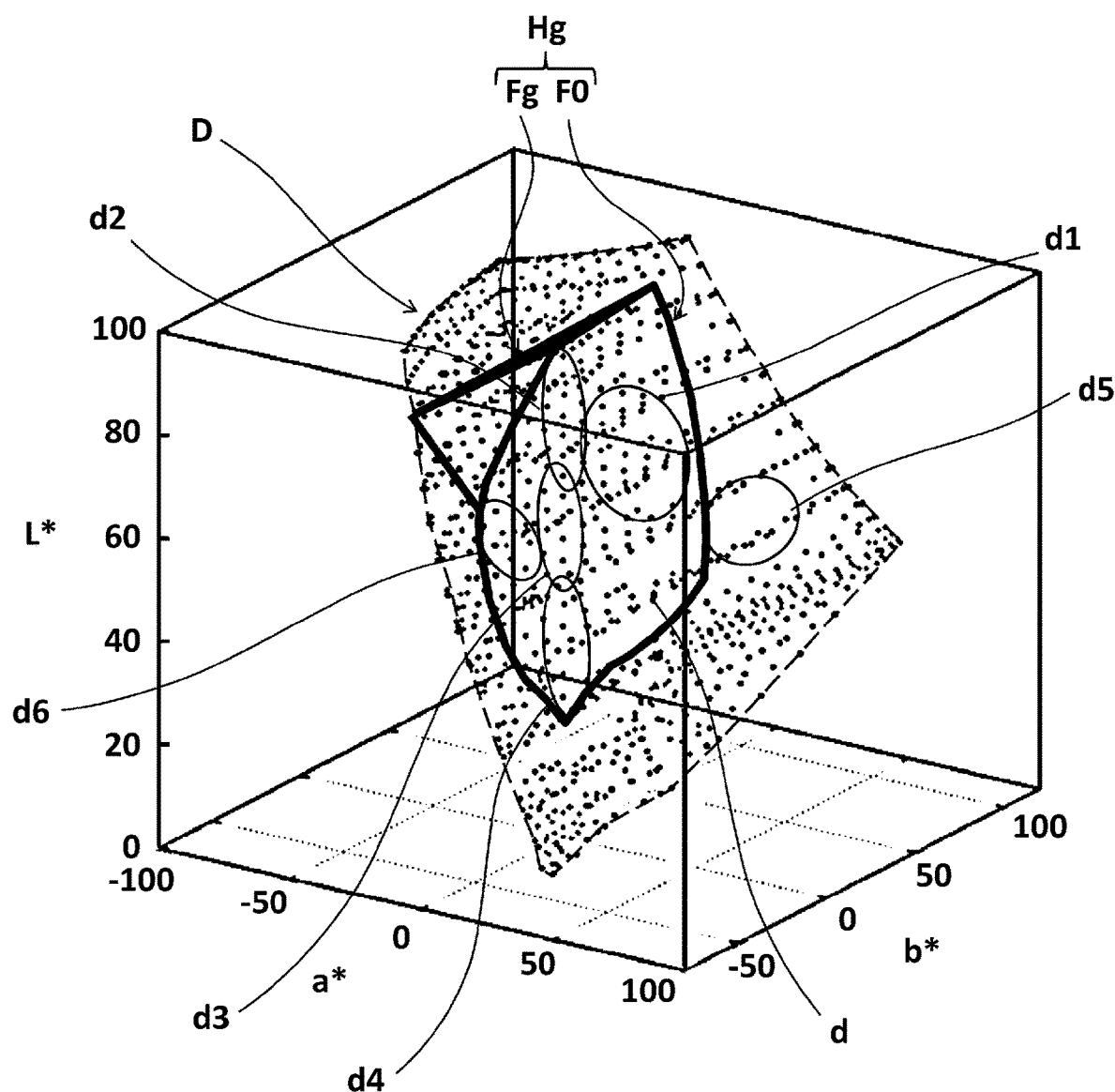
FIG. 10 illustrates the imaging color gamut of the image shown in FIG. 5 and the printing color gamut of green coexisting in the L*a*b* color space.

In the example shown in FIG. 10, the gamuts d1-d4 in the imaging color gamut D, which are the gamuts containing the color values of the parts c1-c4, in the L*a*b* color space and the gamut d6 in the imaging color gamut D, which is the gamut containing the color values of the part d6, fall within the green printing color gamut Hg. Meanwhile, the gamut d5, which is the gamut containing the color values of the part c5, falls outside the green printing color gamut Hg. Therefore, the pixels c0 in the part c5 among the pixels c0 in the image C do not have the imaging color values d that fall within the green printing color gamut Hg, while the pixels c0 in the parts c1-c4, c6 have the imaging color values d that fall within the green printing color gamut Hg. Within the entire area in the image C, the ratio Ig/Ic of the area of the parts corresponding to the imaging color gamut D falling within the green printing color gamut Hg may be, for example, 95%. Therefore, the controller 50 may acquire the evaluation value 95%. In this regard, for example, if the option color of green is used as the custom color, the color of the pixels c0 in the part c5 in the image C may not be reproduced in printing in the inks in the basic colors and the green in the printing apparatus 10.

Figure 11:
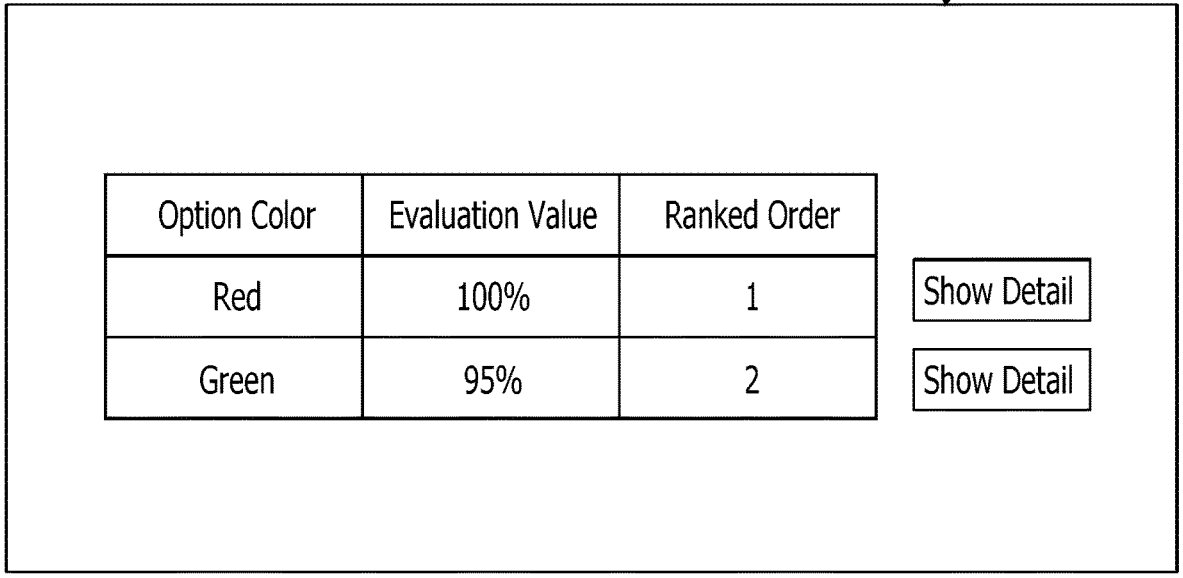
FIG. 11 is a chart to be displayed in a display showing a ranked order of option colors based on evaluation values.

Next, the controller 50 may execute a first displaying operation, in which the controller 50 operates the display 14 to display a ranked order of the option colors based on the evaluation values before the second flow path 13b is loaded with the custom ink (S5). In particular, the controller 50 may rank the evaluation values acquired in S4 in a descending order, store the option colors linked with the evaluation values and the ranks respectively in the storage 53, and operate the display 14 to display a list of the option colors linked with the evaluation values and the ranks as shown in FIG. 11. The user may observe the ranked order of the option colors and select the custom color to be used for printing the image C from the plurality of option colors. The user may supply the ink in the selected custom color to the second tank 12b, and the second flow path 13b may be loaded with the ink in the selected custom color and supplied to the nozzles 24 in the second nozzle lines 22a-22d in the second heads 22. Thereby, with use of the custom color in addition to the basic colors, reproducibility of the image C may be improved.

First Modified Example

Figure 12:
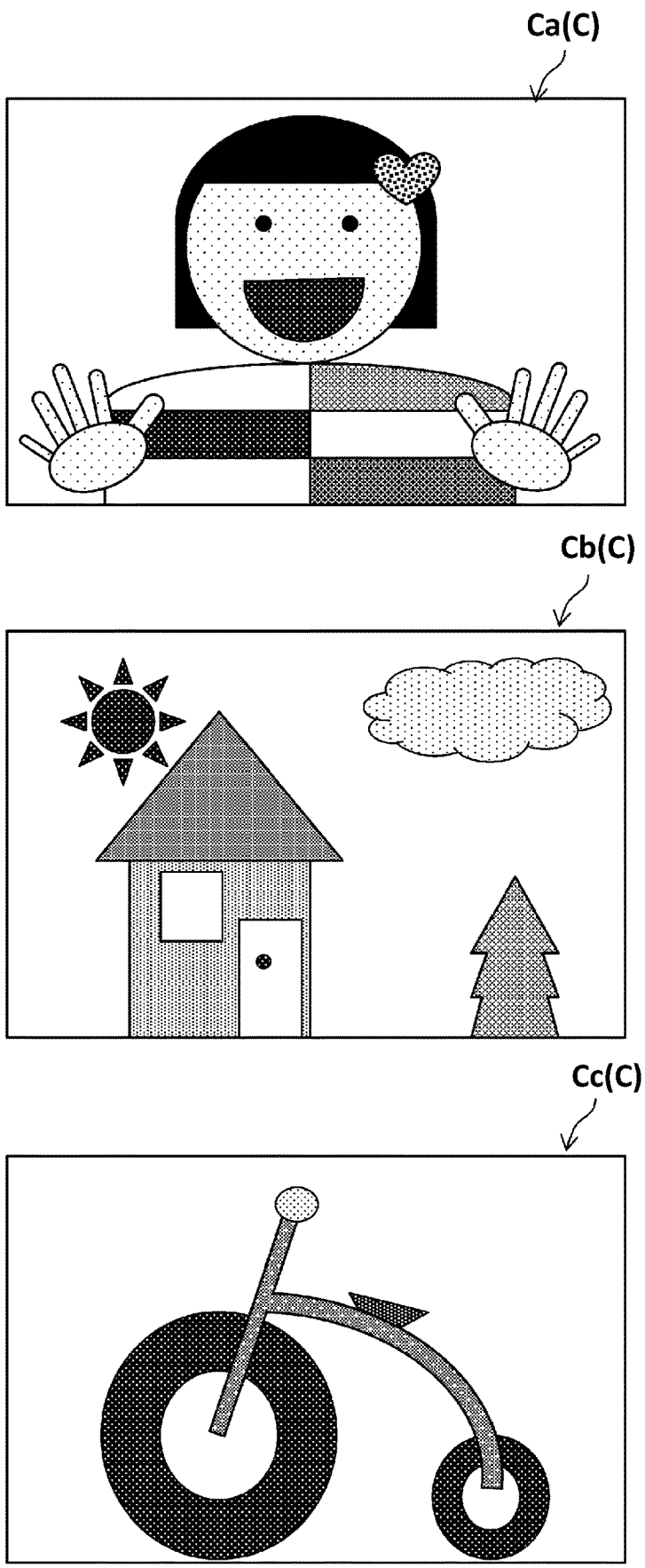
FIG. 12 illustrates images to be used in the imaging color gamut.

A first modified example of the embodiment will be described below. In the printing apparatus 10 in the first modified example, which may be modified from the embodiment described above, the imaging color gamut D includes color values of colors included in image data that compose a plurality of images C. For example, as shown in FIG. 12, the image C includes a first image Ca, a second image Cb, and a third image Cc. In S1 shown in FIG. 4, the controller 50 may acquire three units of image data, which are a unit of image data composing the first image Ca, a unit of image data composing the second image Cb, and a unit of image data composing the third image Cc, from the external device B.

In the first acquiring operation in S2 shown in FIG. 4, the controller 50 may acquire color values of colors in the first image Ca from the image data composing the first image Ca, color values of colors in the second image Cb from the image data composing the second image Cb, and color values of colors in the third image Cc from the image data composing the third image Cc. The controller 50 may draw imaging color values d being the Lab values of the entire pixels c0 in the first image Ca, the second image Cb, and the third image Cd in the L*a*b* color space. The controller 50 may acquire an imaging color gamut D, which is a range including the entire imaging color values d of the first image Ca, the second image Cb, and the third image Cc occupy in the L*a*b* color space. The imaging color gamut D is a closed range in the L*a*b* color space and contains the imaging color values d of the entire pixels c0 composing the first image Ca, the second image Cb, and the third image Cc. In this arrangement, the imaging color gamut D including the color values d of the colors in the plurality of images Ca, Cb, Cc may be defined, and reproducibility of the images C may be improved to a wider range.

Second Modified Example

In the printing apparatus 10 in a second modified example, which may be modified from the embodiment described earlier and the first modified example, the evaluation values may include ratios of volumes Jr, Jg of the printing color gamuts Hr, Hg in the imaging color gamut D, to a volume Jc of the imaging color gamut D in the color space.

In the third acquiring operation in S4 shown in FIG. 4, the controller 50 may acquire a volume Jc of the imaging color gamut D of the image C in the L*a*b color space based on the imaging color values d. The controller 50 may acquire a volume Jr, in which the imaging color gamut D overlaps the red printing color gamut Hr in the L*a*b* color space based on the imaging color values d and the color values of the basic colors and the option color red. The controller 50 may acquire a ratio Jr/Jc of the acquired volume Jr of the red printing color gamut Hr in the imaging color gamut D to the volume Jc of the imaging color gamut D as the evaluation value. Further, the controller 50 may acquire a volume Jg, in which the imaging color gamut D overlaps the green printing color gamut Hg in the L*a*b color space based on the imaging color values d and the color values of the basic colors and the option color green. The controller 50 may acquire a ratio Jg/Jc of the acquired volume Jg of the green printing color gamut Hg in the imaging color gamut D to the volume Jc of the imaging color gamut D as the evaluation value.

In the first displaying operation in S5 shown in FIG. 4, the controller 50 may operate the display 14 to display a list of the option colors ranked according to the evaluation values before the second flow path 13b is loaded with the ink in the custom color. Thereby, with use of the custom color in addition to the basic colors, reproducibility of the image C may be improved.

Third Modified Example

In the printing apparatus 10 in a third modified example, which may be modified from the embodiment described earlier and the first and second modified examples, the imaging color gamut D may include a first color gamut, which includes color values included in image data composing a first part, in a predetermined color space. The first part is a part in the image C having a size greater than or equal to a predetermined size, and a difference between the color value of the color in the first part and color values of colors in a periphery of the first part is greater than or equal to a predetermined amount. The controller 50 may execute a determining operation, in which the controller 50 determines whether the first color gamut falls within the printing color gamut. If the controller 50 determines that the first color gamut falls within the predetermined printing color gamut, in the first displaying operation, the controller 50 may operate the display 14 to display a first result being a result of the determining operation, along with the rank order of the option colors.

Figure 13:
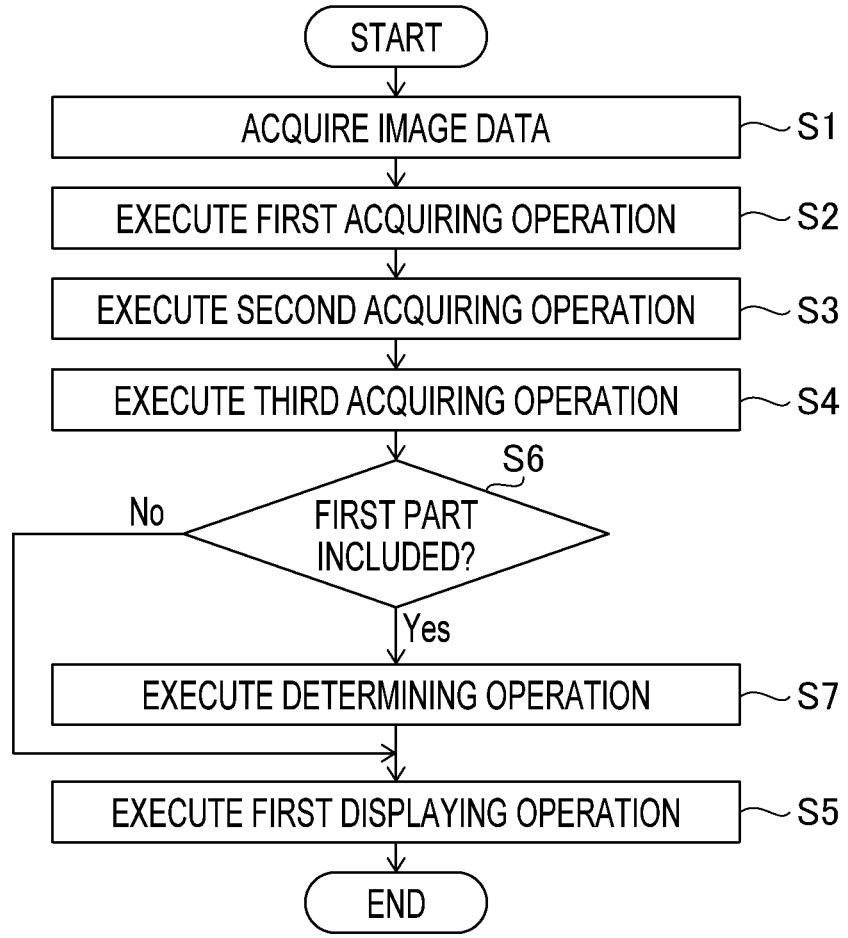
FIG. 13 is a flowchart to illustrate a third modified example of the controlling flow of steps to be executed in the printing apparatus.

For example, the printing apparatus 10 may be operated by the controller 50 according to a controlling flow as shown in FIG. 13. The flowchart shown in FIG. 13 has S6 and S7 between S4 and S5 in the flowchart shown in FIG. 4.

Figure 14:
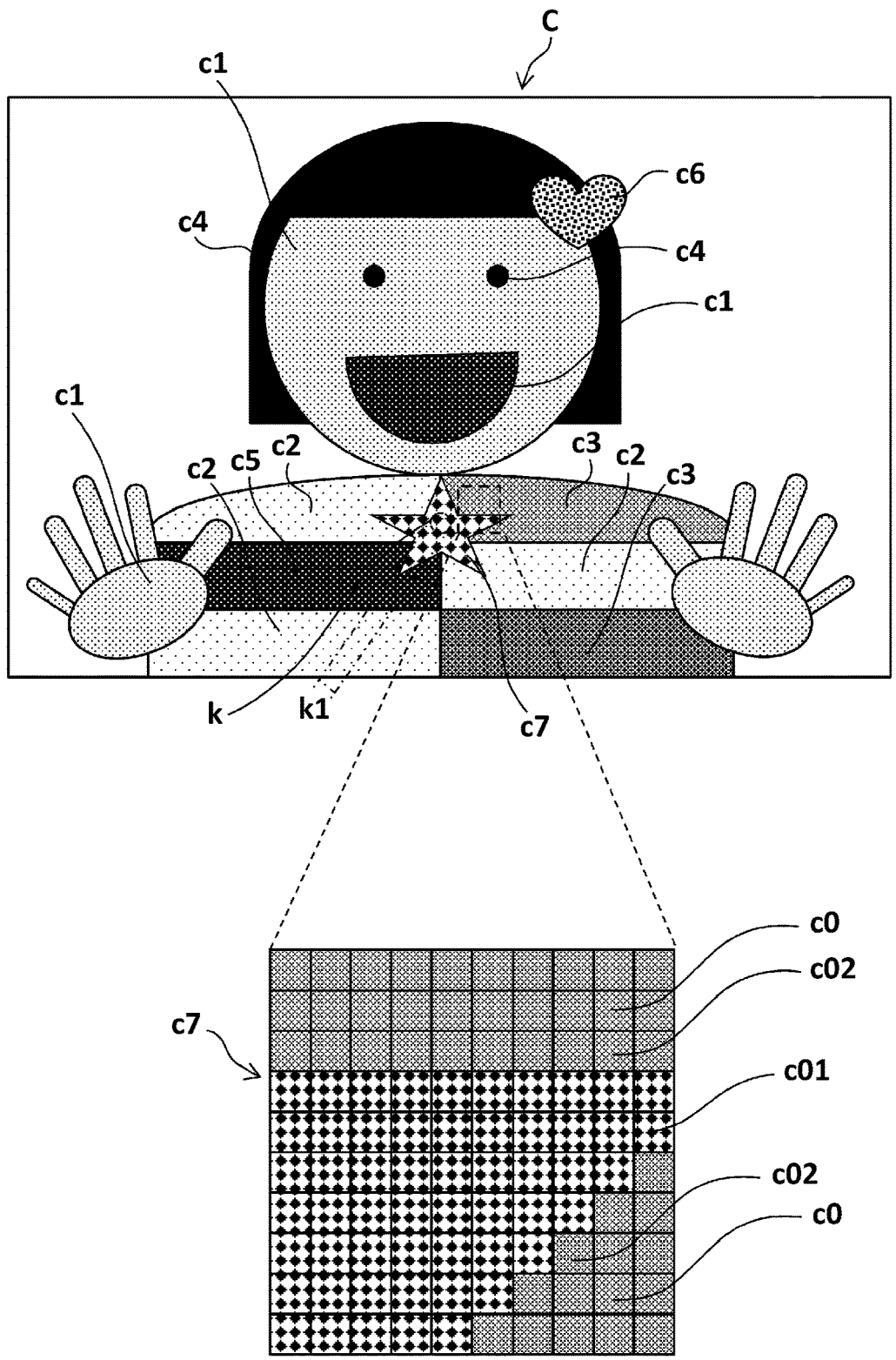
FIG. 14 illustrates an image composed of image data acquired in a first acquiring operation in the flowchart shown in FIG. 13.
Figure 15:
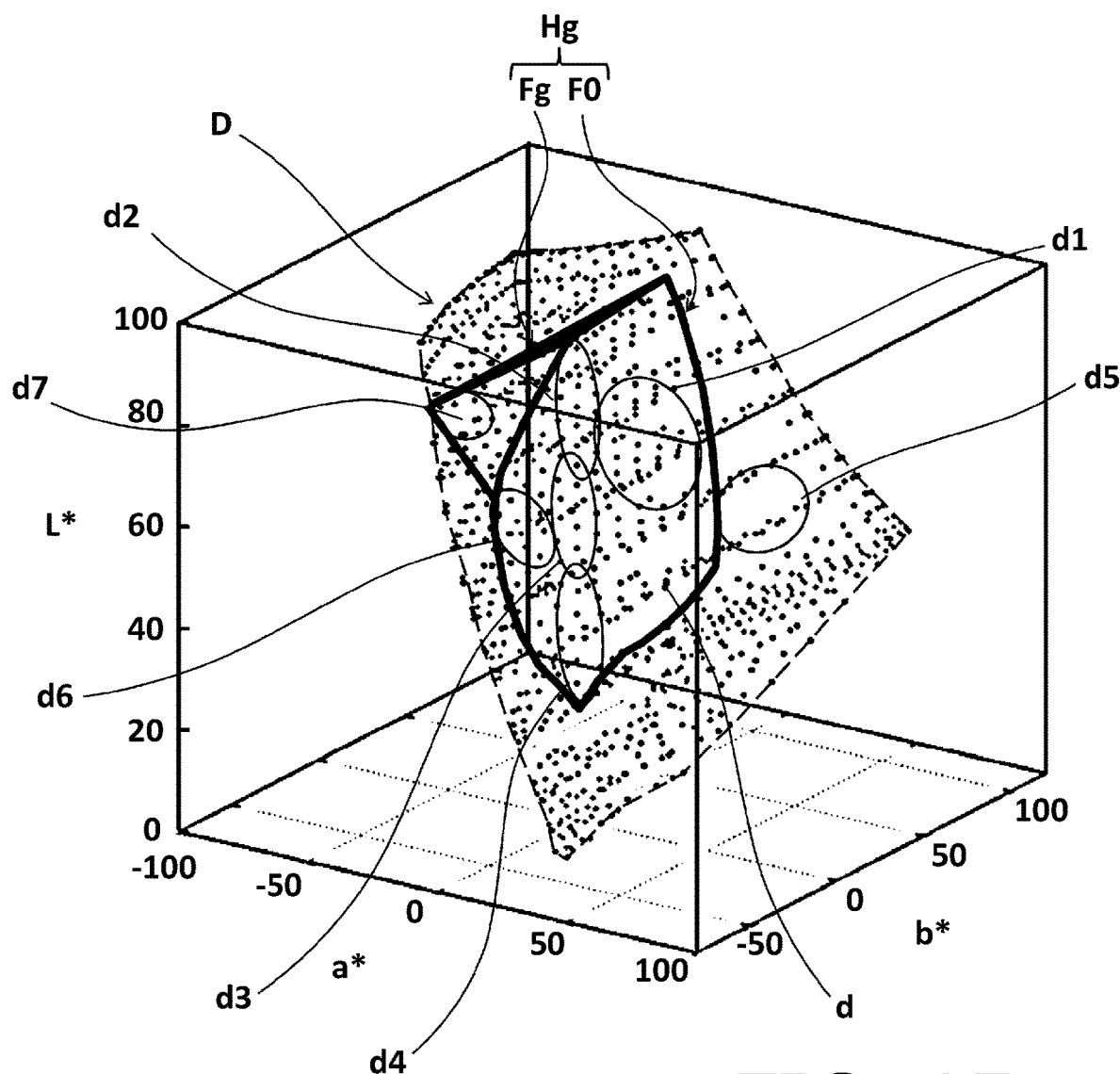
FIG. 15 illustrates an imaging color gamut of the image shown in FIG. 14 and a printing color gamut of red coexisting in the L*a*b* color space.

In particular, the controller 50 may acquire image data composing the image C as shown in FIG. 14 (S1). The image C in FIG. 14 has, further to the parts c1-c6 in the image C shown in FIG. 5, a part c7 forming a pendant in a color of green. The controller 50 may execute the first acquiring operation to acquire the imaging color gamut D, which includes the color values in the image data composing the image C, in the L*a*b color space. As shown in FIG. 15, a color gamut d7, in which the color values of the colors in the part c7, falls within the imaging color gamut D. The controller 50 may acquire the printing color gamuts Hr, Hg of the red and green option colors in the second acquiring operation in S3 and acquire the evaluation values based on the printing color gamuts Hr, Hg and the imaging color gamut D in the third acquiring operation in S4.

The controller 50 may determine whether the image C includes a first part having a size greater than or equal to a predetermined size (S6). The predetermined size is a size, which may be recognized by a viewer standing at a position apart from the image C by a predetermined distance. The predetermined size may be, for example, a size containing a circle k with a diameter of k1, which has a length more than or equal to two (2) cycles and less than or equal to six (6) cycles, within a field of view of 1 degree when viewed from a distance to normally observe the printed image C. The first part having the size greater than or equal to the predetermined size may not be large but may be recognizable to some or many viewers and may be regarded as material to the image C.

The first part has a plurality of pixels c0. Between a smallest one of the imaging color values in the plurality of pixels c0 in the first part and a largest one of the imaging color values in the plurality of pixels c0 in the first part, a color difference is less than or equal to a first predetermined color difference. For example, the color difference may be expressed in an inter-color distance, which is a distance between two color coordinates when the lab values are expressed in color coordinates in the L*a*b* color space. The first predetermined color difference is a color difference where two colors are recognizable as a same color and may be, for example, $\Delta E=5$. Thus, the first part, within which the color difference is less than or equal to the first predetermined color difference, is recognizable as a part in a same color.

As shown in FIG. 14, between an imaging color value d of pixels c01, which are pixels c0 in the first part, and an imaging color value d of peripheral pixels c02 adjoining the pixels c01, a color difference is greater than or equal to a second predetermined color difference. The peripheral pixels c02 are pixels c0 adjacent to pixels c01 that form a contour of the first part among the pixels c01 in the first part. No other pixel c0 intervenes between the pixel c01 that forms the contour of the first part and the peripheral pixel c02. The second predetermined color difference is a color difference, by which two colors are recognizable as different colors and may be, for example, $\Delta E=10$. Thus, the first part, of which the color difference from the periphery is greater than or equal to the second predetermined color difference, is distinguishable from the periphery.

For determining in S6, first, the controller 50 may remove high-frequency components in spatial frequency that may not be recognizable to human eyes from the image data composing the image C and further remove high-frequency components having cycles of six (6) or more within the field of view of 1 degree from the distance to normally observe the printed image C. The high-frequency components may be removed by, for example, with use of a low-pass filter and a two-dimensional Fourier transform. Further, the controller 50 may acquire the imaging color values d and positions of the pixels c0 in the image C from the image data. The pixels c0 are arrayed in an x-direction and in a y-direction that intersects, for example, orthogonally, with the x-direction. The positions of the pixels c0 may be defined by a position in the x-direction and the y-direction with reference to a predetermined position in the image C.

The controller 50 may extract a range, e.g., the part c7, in which the color difference between the largest color value and the smallest color value is smaller than or equal to the first predetermined color difference. The controller 50 may acquire a color difference between the imaging color values d of the pixels c0 in the extracted part c7 and the imaging color values d of the peripheral pixels c02 outside the part c7 and adjacent to the pixels c0 in the part 7 to determine whether the color difference is greater than or equal to the second predetermined color difference. Moreover, the controller 50 may acquire dimensions of the part c7 based on the positions of the pixels c0 and determine whether the dimensions include the circle k having the dimension k1. If the controller 50 determines that the size of the part 7 is greater than or equal to the circle k, the controller 50 may determine that the part c7 forms the first part (S6: YES).

If the controller 50 determines that the part c7 forms the first part (S6: YES), the controller 50 may determine whether a first color gamut d7 of the part c7 falls within the printing color gamuts Hr, Hg in the L*a*b* color space (S7). For example, in the example shown in FIG. 15, the controller 50 may compare the first color gamut d7 with the printing color gamuts Hr, Hg and determine that the first color gamut d7 does not fall within the red printing color gamut Hr but falls within the green printing color gamut Hg.

Figure 16:
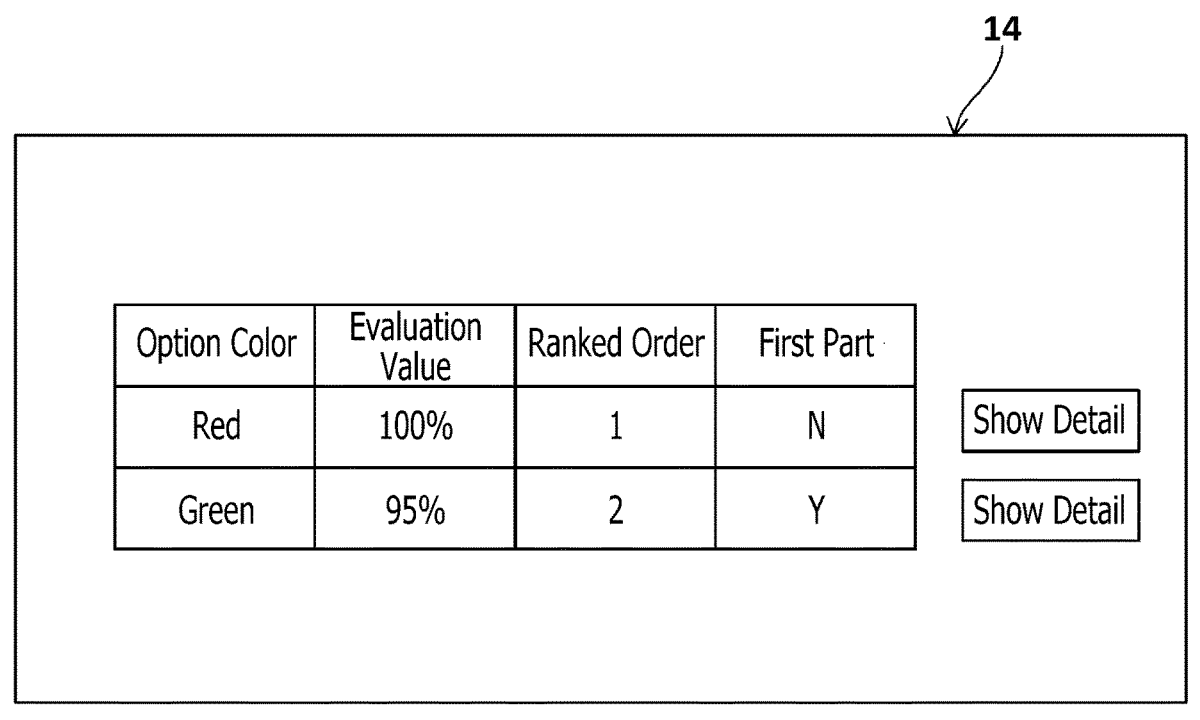

Next, in the first displaying operation in S6, if the controller 50 determines that the image C has the first part, the controller 50 may operate the display 14 to display the evaluation values and the result of the determination in S7 as illustrated in FIG. 16 before the second flow path 13b is loaded with the ink in the custom color. In the example of FIG. 16, the first color gamut d7 of the part c7 forming the first part does not fall within the red printing color gamut Hr; therefore, the result of the determination "not applicable" may be expressed by a sign "N." Meanwhile, the first color gamut d7 of the part c7 forming the first part falls within the green color gamut Hg; therefore, the result of the determination "applicable" may be expressed by a sign "Y." Thereby, the user may select one of the custom colors to be used for printing the image C among the plurality of option colors based on the result of the determination concerning suitability of the custom colors, along with the ranked order of the custom colors, and reproducibility of the image C may be improved. Optionally, the ranked order and the result of the determination of the option color red, of which printing color gamut Hr does not include the first color gamut d7, may not necessarily be displayed in the display 14 in the first displaying operation.

Fourth Modified Example

In the printing apparatus 10 in a fourth modified example which may be modified from the embodiment described earlier and the first through third modified examples, the controller 50 may execute a second displaying operation. In the second displaying operation, the controller 50 may display the image C in the display 14 in an appearance such that a part of the image C having color values that fall within the imaging color gamut D but do not fall within the printing color gamuts Hr, Hg and another part of the image C having color values that fall within the imaging color gamut D and within the printing color gamuts Hr, Hg are distinctive.

Optionally, the controller 50 may convert color values d that fall within the imaging color gamut D but do not fall within the printing color gamut Hg into a different color value d. In this arrangement, the controller 50 may operate the display 14 to display the part of the image C having the color values d in the imaging color gamut D that do not fall within the printing color gamut Hg based on the different color values d. Meanwhile, the controller 50 may operate the display 14 to display another part of the image C having the color values d in the imaging color gamut D that fall within the printing color gamut Hg without converting.

Figure 17:
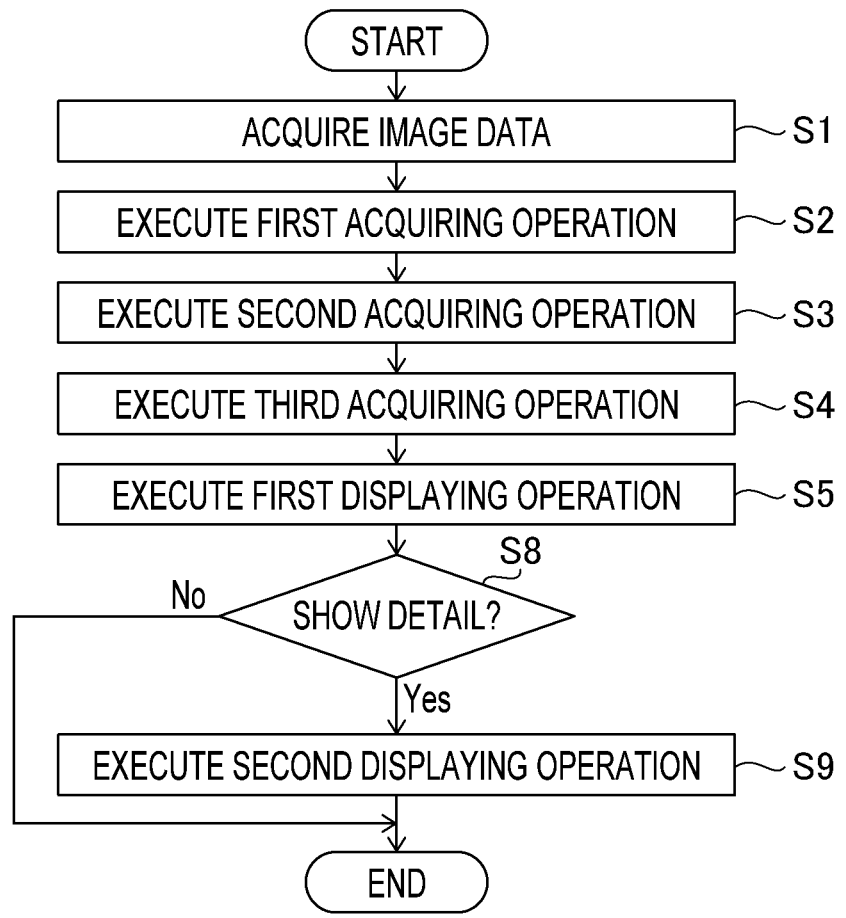
FIG. 17 is a flowchart to illustrate a fourth modified example of the controlling flow of steps to be executed in the printing apparatus.

For example, the printing apparatus 10 may be operated by the controller 50 according to a controlling flow as shown in FIG. 17. The flowchart shown in FIG. 17 has S8 and S9 following S5 in the flowchart shown in FIG. 4.

For example, the user may observe the ranked order of the option colors in the first displaying operation in S5 and may desire to view details of the evaluations. Therefore, the controller 50 may operate the display 14 to display buttons that are linked to the detailed display of the option colors, as shown in FIGS. 11 and 16. For example, the user may move a cursor to a position of one of the buttons through the input device 15 and enter a selection for the detail of the one of the option colors. In response, the controller 50 may determine that the detail concerning the selected option color will be displayed (S8: YES).

Figure 18A:
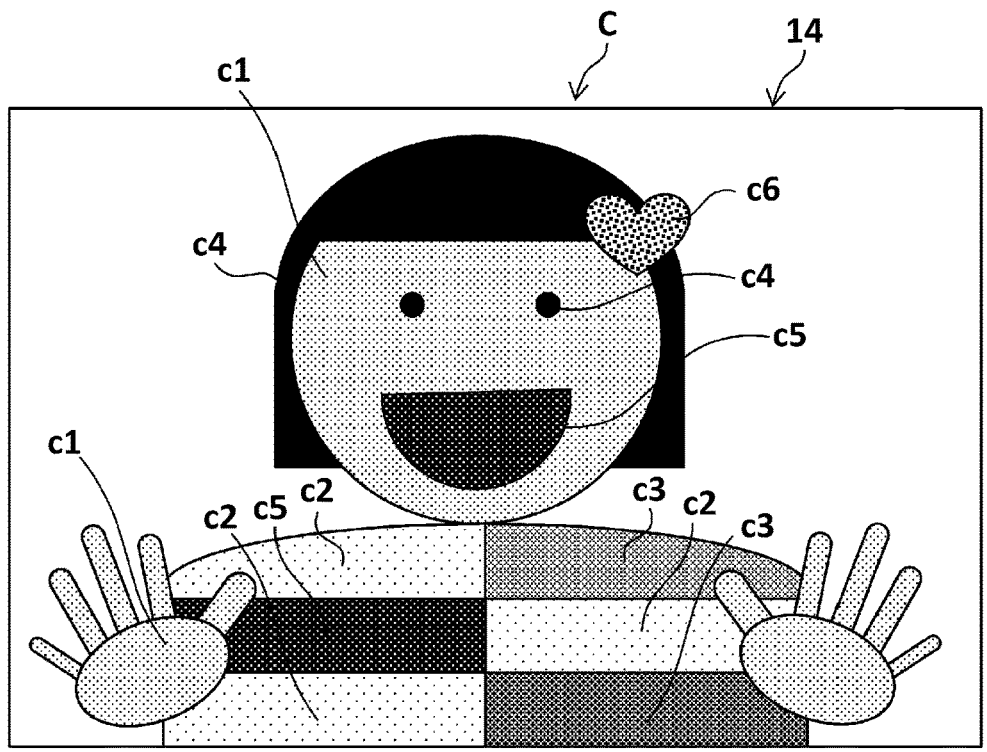
FIGS. 18A-18B illustrate images to be displayed in a second displaying operation in the controlling flow shown in FIG. 17.

When the user's selection for the detail of the option color is entered (S8: YES), the controller 50 may execute the second displaying operation (S9). For example, if the user's selection for the detail of the option color red is entered, the controller 50 may extract the imaging color values d that do not fall within the red printing color gamut Hr from the imaging color values d in the imaging color gamut D. In the example shown in FIG. 5, the imaging color values of substantially all of the pixels c0 composing the image C fall within the red printing color gamut Hr. Therefore, the controller 50 may, without converting the imaging color values d of the pixels c0 falling within the red printing color gamut Hr into another color value, operate the display 14 to display the image C as shown in FIG. 18A. Thereby, the user observing the displayed image C may recognize that the image C is entirely included in the red printing color gamut Hr and select the custom color from the option colors to improve reproducibility of the image C based on the recognition.

Figure 18B:
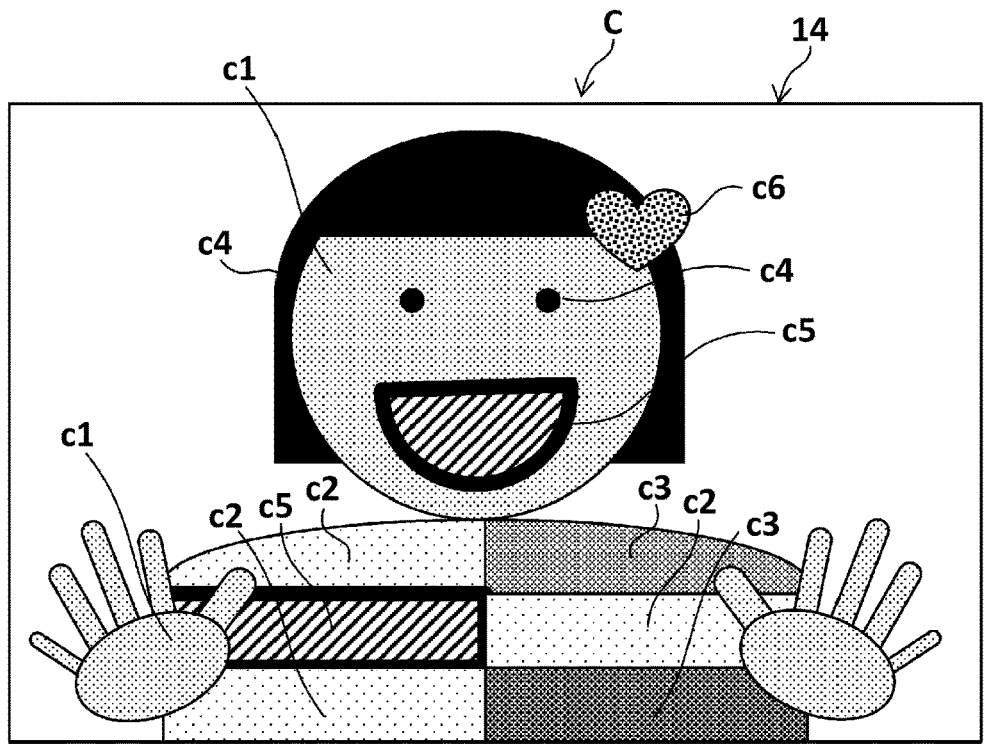

For another example, if the user's selection for the detail of the option color green is entered, the controller 50 may extract the imaging color values d that do not fall within the green printing color gamut Hg from the imaging color values d in the imaging color gamut D, as shown in FIG. 10. In the example shown in FIG. 10, the imaging color values d in the color gamut d5 does not fall within the green printing color gamut Hg. The controller 50 may not convert the imaging color values d falling within the green printing color gamut Hg into another color value. Meanwhile, the controller 50 may convert the imaging color values d that do not fall within the green printing color gamut Hg into another color value. The controller 50 may operate the display 14 to display the image C, in which the imaging color values d in the color gamut d5 are converted, as shown in FIG. 18B. For example, the part c5 forming the mouth and the garment that has the imaging color values d falling within the color gamut d5, which is outside the green printing color gamut Hg, may be displayed in a color having a color value different from the imaging color values d in the color gamut d5 in the display 14. For example, the part 5 may be displayed differently in an arrangement in, for example, white and blue two-toned diagonal shading. Meanwhile, the other parts in the image C having the color values d falling within the green printing color gamut Hg may be displayed in the unconverted imaging color values d. Thereby, the part c in the image C may be distinguished from the other parts in the image C. Thus, the user observing the displayed image C may recognize that the part c5 does not fall within the green printing color gamut Hg, and select the custom color from the option colors to improve reproducibility of the image C based on the recognition effectively.

Fifth Modified Example

In the printing apparatus 10 in a fifth modified example, which may be modified from the embodiment described earlier and the first through fourth modified examples, the controller 50 may execute a third displaying operation, in which the color space expressing the imaging color gamut D is displayed in the display 14. Moreover, the controller 50 may execute a fourth display operation, in which color differences between the color values in the image C corresponding to a position in the color space designated by the user through the input device 15 and the printing color gamuts Hr, Hg may be displayed in the display 14.

Figure 19:
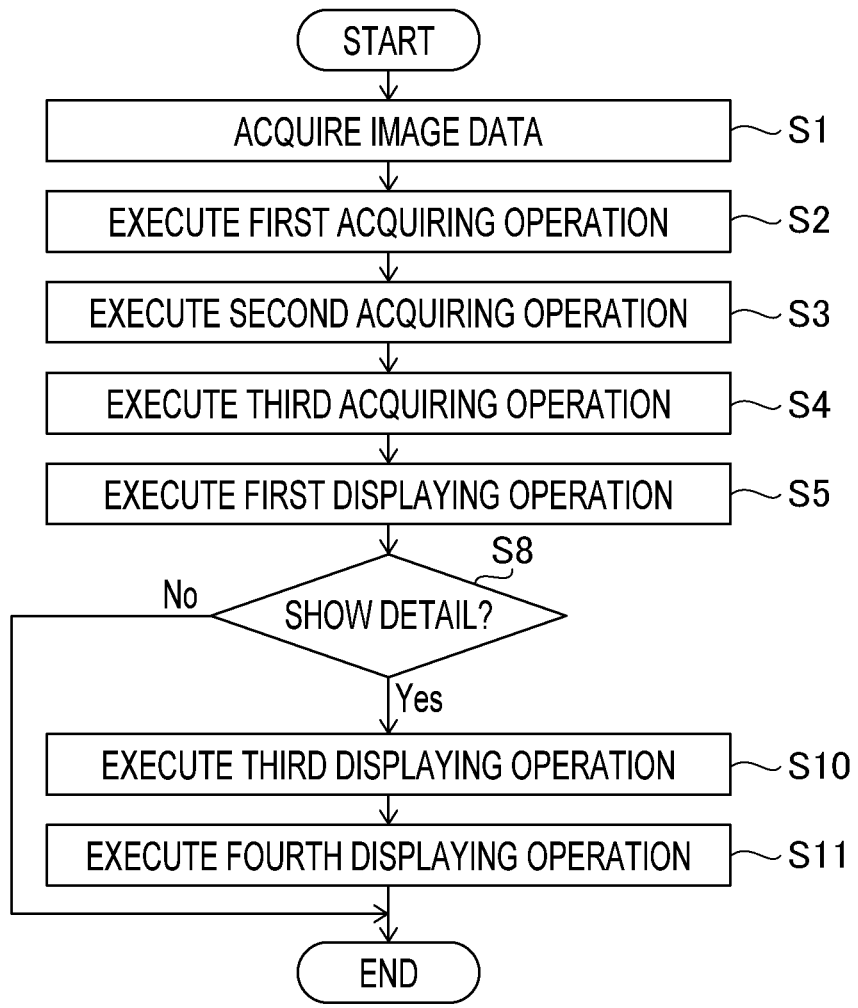
FIG. 19 is a flowchart to illustrate a fifth modified example of the controlling flow of steps to be executed in the printing apparatus.

For example, the printing apparatus 10 may be operated by the controller 50 according to a controlling flow as shown in FIG. 19. The flowchart shown in FIG. 19 has S10 and S11 in place of S9 in the flowchart shown in FIG. 17.

Figure 20:
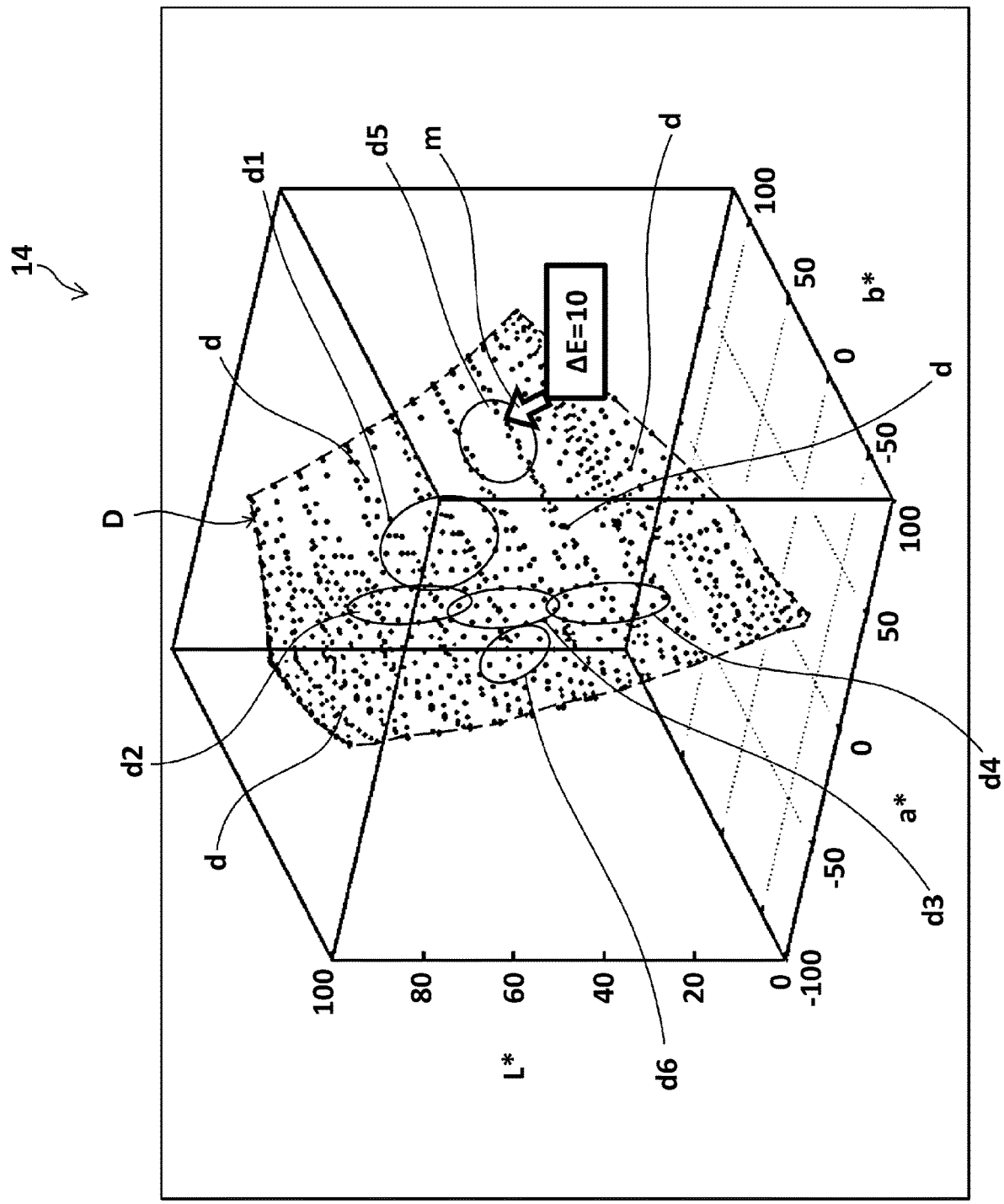
FIG. 20 illustrates an image to be displayed in a fourth displaying operation in the controlling flow shown in FIG. 19.

For example, when the user's selection for the detail of the option color is entered through the input device 15 (S8: YES), the controller 50 may execute the third displaying operation (S10). In the third displaying operation, the controller 50 may operate the display 14 to display the L*a*b* color space, which expresses the imaging color values d in the imaging color gamut D acquired in the first acquiring operation in S2, as shown in FIG. 20. The user may move a cursor m displayed in the display 14 through the input device 15 to point the cursor m at a position of the imaging color value d in the L*a*b* color space and input the position of the imaging color value d in the controller 50.

The controller 50 may execute a fourth displaying operation (S11). In the fourth displaying operation, the controller 50 may acquire the imaging color value d in the color gamut d5 corresponding to the position input by the user through the input device 15. If the user's selection for the detail of the option color red is entered in S8, while the color gamut d5 falls within the red printing color gamut Hr, the controller 50 may operate the display 14 to display a sign "ΔE=0," which indicates a color difference between the imaging color value d in the color gamut d5 and the red printing color gamut Hr. Thereby, the user observing the displayed color difference may recognize that the imaging color value d at the pointed position falls within the red printing color gamut Hr and select the custom color from the option colors to improve reproducibility of the image C based on the recognition.

On the other hand, if the user's selection for the detail of the option color green is entered in S8, the color gamut d5 does not fall within the green printing color gamut Hg. The controller 50 may acquire a color difference between the imaging color value d of the color gamut d5 and the green printing color gamut Hg. If the imaging color value d of the color gamut d5 does not fall within the green printing color gamut Hg, for example, a length of a line drawn perpendicularly from the imaging color value d to the green printing color gamut Hg in the L*a*b* color space may be acquired as the color difference. Occasionally, a shortest one of lengths drawn between the imaging color value d and the green printing color gamut Hg may be acquired as the color difference. The controller 50 may operate the display 14 to display a sign "ΔE=10" indicating the color difference. Thereby, the user observing the displayed color difference may recognize that the imaging color value d at the pointed position falls outside the green printing color gamut Hg and select the custom color from the option colors to improve reproducibility of the image C based on the recognition.

Sixth Modified Example

In the printing apparatus 10 in a sixth modified example, the controller 50 may execute a fifth displaying operation. In the fifth displaying operation, the controller may operate the display 14 to display labels n at positions of outlines of the printing color gamuts Hr, Hg. The labels n express that the color differences between the printing color gamuts Hr, Hg and the imaging color gamut D increase as the color values are separated farther outward from the positions of the outlines of the printing color gamuts Hr, Hg by varying at least one of hue, brightness, and saturation.

Figure 21:
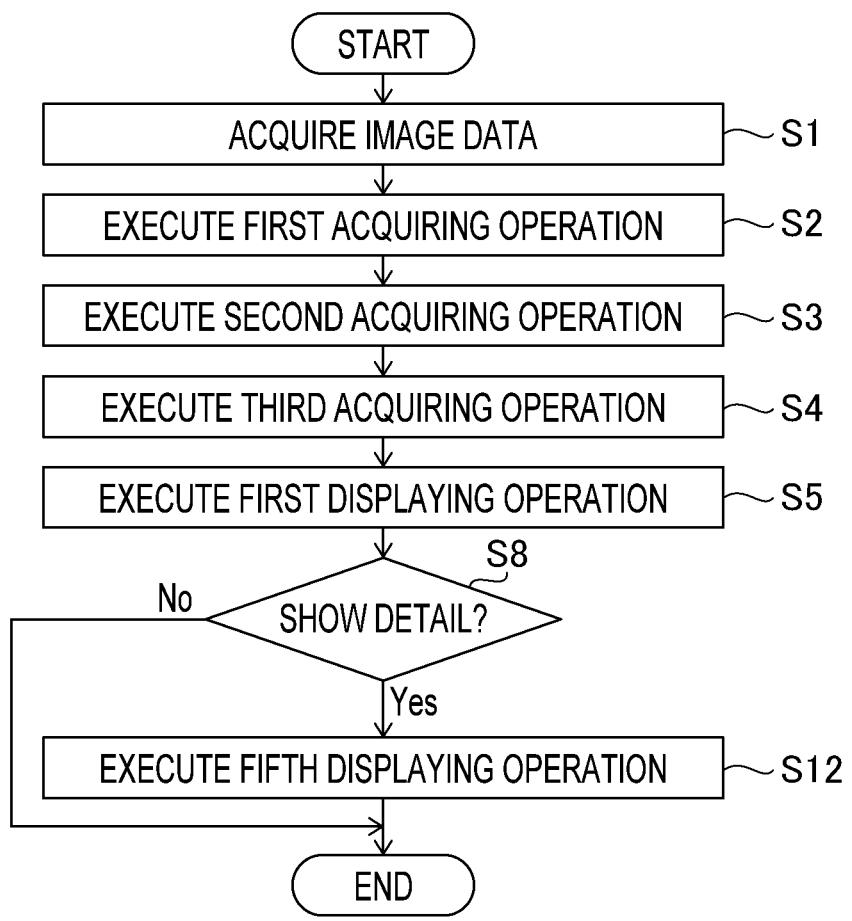
FIG. 21 is a flowchart to illustrate a sixth modified example of the controlling flow of steps to be executed in the printing apparatus.

For example, the printing apparatus 10 may be operated by the controller 50 according to a controlling flow as shown in FIG. 21. The flowchart shown in FIG. 21 has S12 in place of S9 in the flowchart shown in FIG. 17.

For example, when the user's selection for the detail of the option color is entered through the input device 15 (S8:

YES), the controller 50 may execute a fifth displaying operation (S12). For example, if the user's selection for the detail of the option color green is entered, in the fifth displaying operation, the controller 50 may operate the display 14 to display the L*a*b* color space, in which the imaging color values d in the imaging color gamut D acquired in the first acquiring operation in S2 and the green printing color gamut Hg acquired in the second acquiring operation in S3 are expressed.

Figure 22:
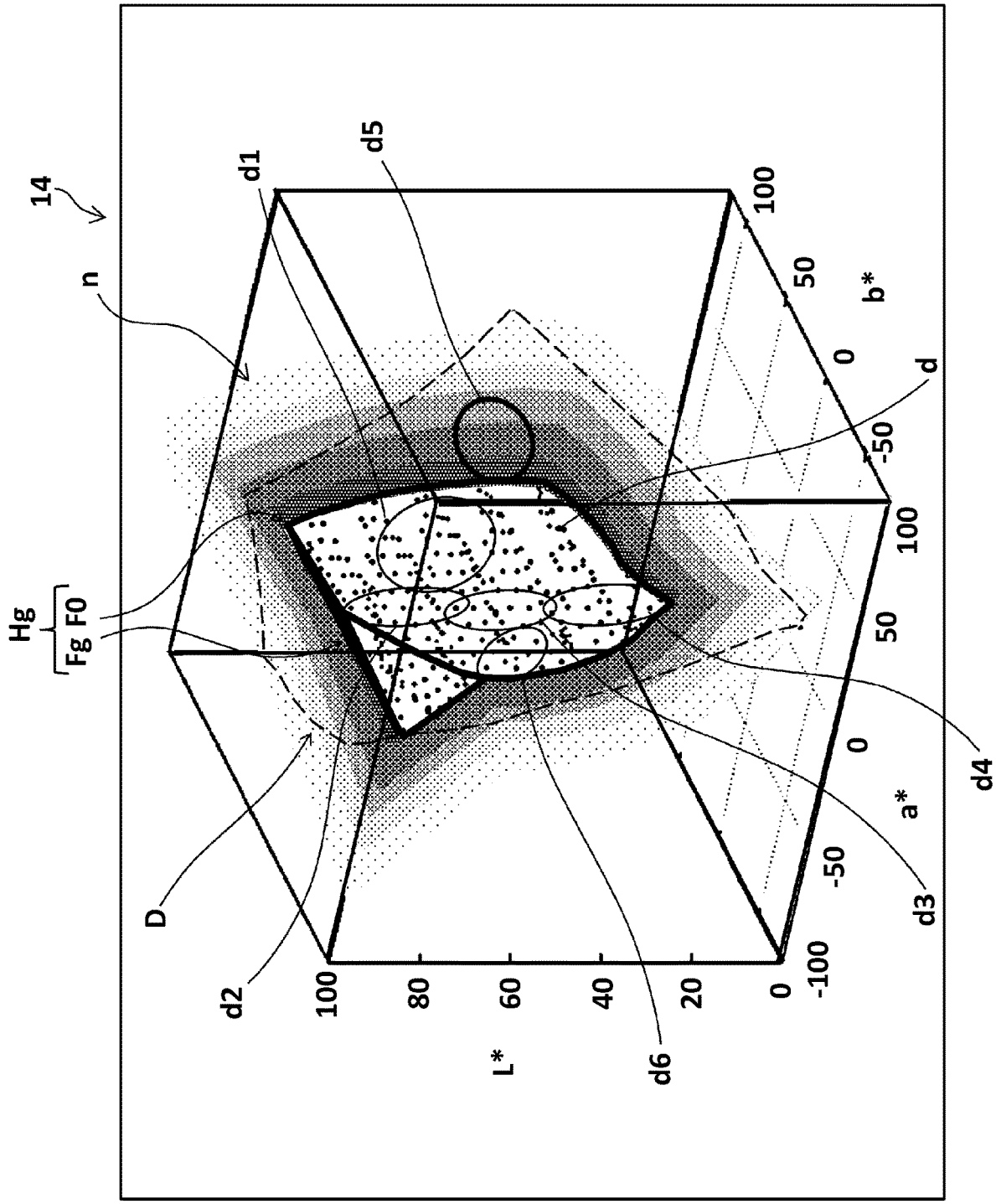
FIG. 22 illustrates an image to be displayed in a fifth displaying operation in the controlling flow shown in FIG. 21.

The controller 50 may acquire outer-gamut color values, which are lab values outside the green printing color gamut Hg in the L*a*b* color space and acquire color differences between the outer-gamut color values and the green printing color gamut Hg. At the outline positions of the green printing color gamut Hg, there may be no color difference; therefore, $\Delta E=0$ may be acquired. Meanwhile, as the color values in the L*a*b* color space are separated from the outline positions of the green printing color gamut Hg farther outward, the color difference of the color values from the green printing color gamut Hg becomes greater. Therefore, the label n expressing the varying color difference may be displayed in the L*a*b* color space. The label n is continuous to the outline of the green printing color gamut Hg at one end and extends in a direction to separate from the green printing color gamut Hg. In the example shown in FIG. 22, the label n has higher brightness to appear whiter as the color difference increases. Thereby, the user observing the labels n may recognize the color difference between the imaging color gamut D and the green printing color gamut Hg and may select the custom color from the option colors to improve reproducibility of the image C based on the recognition effectively. The labels n are displayed in a mode such that at least one of hue, brightness, and saturation thereof varies depending on largeness of the color difference.

On the other hand, if the user's selection for the detail of the option color red is entered, in the fifth displaying operation, the controller 50 may operate the display 14 to display the L*a*b* color space, which expresses the imaging color gamut D acquired in the first acquiring operation in S2 and the red printing color gamut Hr acquired in the second acquiring operation in S3. The controller 50 may acquire color differences between the outer-gamut color values outside the red printing color gamut Hr and the green printing color gamut Hg and display the labels n expressing the acquired color differences in the L*a*b* color space. Thereby, the user observing the labels n may recognize the color difference between the imaging color gamut D and the red printing color gamut Hr and may select the custom color from the option colors to improve reproducibility of the image C based on the recognition effectively.

Seventh Modified Example

In the printing apparatus 10 in a seventh modified example, which may be modified from the embodiment described earlier and the first through sixth modified examples, the controller 50 may execute a sixth displaying operation. In the sixth displaying operation, the controller 50 may replace colors of the pixels c0 in the image C that are outside the printing color gamuts Hr, Hg with a color, in which at least one of hue, brightness, and saturation is changed according to the color difference from the printing color gamut Hr, Hg, and operate the display 14 to display the image C.

In the sixth displaying operation, the controller 50 may, for example, replace the colors of the pixels c0 in the image C that fall within the printing color gamuts Hr, Hg with a plain color different from the color that replaces the colors of the pixels c0 outside the printing color gamuts Hr, Hg.

Figure 23:
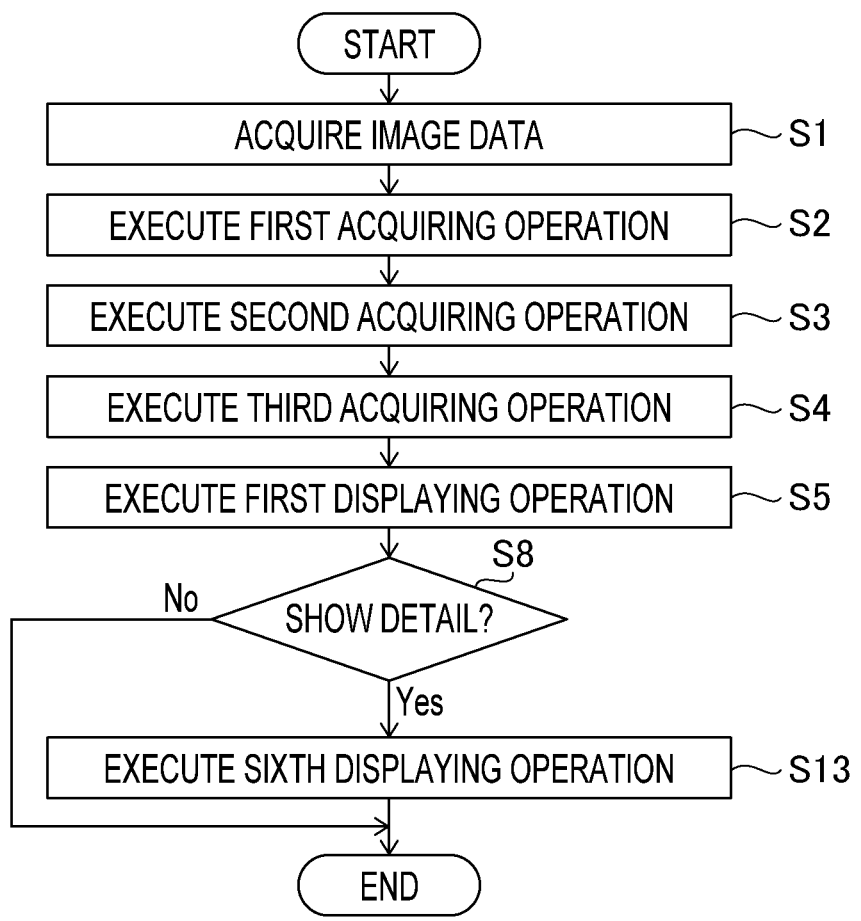
FIG. 23 is a flowchart to illustrate a seventh modified example of the controlling flow of steps to be executed in the printing apparatus.

For example, the printing apparatus 10 may be operated by the controller 50 according to a controlling flow as shown in FIG. 23. The flowchart shown in FIG. 23 has S13 in place of S9 in the flowchart shown in FIG. 17.

For example, when the user's selection for the detail of the option color is entered (S8: YES), the controller 50 may execute the sixth displaying operation (S13). If the user's selection for the detail of the option color green is entered, the controller 50 may acquire a color difference between the imaging color gamut D acquired in the first acquiring operation in S2 and the green printing color gamut Hg acquired in the second acquiring operation in S3. The controller 50 may convert the imaging color value d in the imaging color gamut D into a color value according to the acquired color difference. For example, as the color difference between the imaging color gamut D and the green printing color gamut Hg is greater, the controller 50 may convert the imaging color values d to a color value, of which brightness is higher.

In the example shown in FIG. 10, the color gamut d5 in the imaging color gamut D does not fall within the printing color gamut Hg, but the other color gamuts fall within the printing color gamut Hg. In this case, the color difference between the imaging color values d of the color gamut d5 and the printing color gamut Hg is greater than zero (0); therefore, the controller 50 may convert the color values d to a color value having higher brightness to be whiter as the color difference increases. Meanwhile, between the imaging color values d in the color gamuts other than the color gamut d5 and the printing color gamut Hg, there may be no color difference, and $\Delta E=0$ may be acquired. Therefore, the controller 50 may convert the imaging color values d in these color gamuts into a color value, of which brightness is lower, i.e., to the color value of black. The controller 50 may operate the display 14 to display the image C based on the image data, in which the imaging color values d are converted, as shown in FIG. 24A.

Figure 24A:
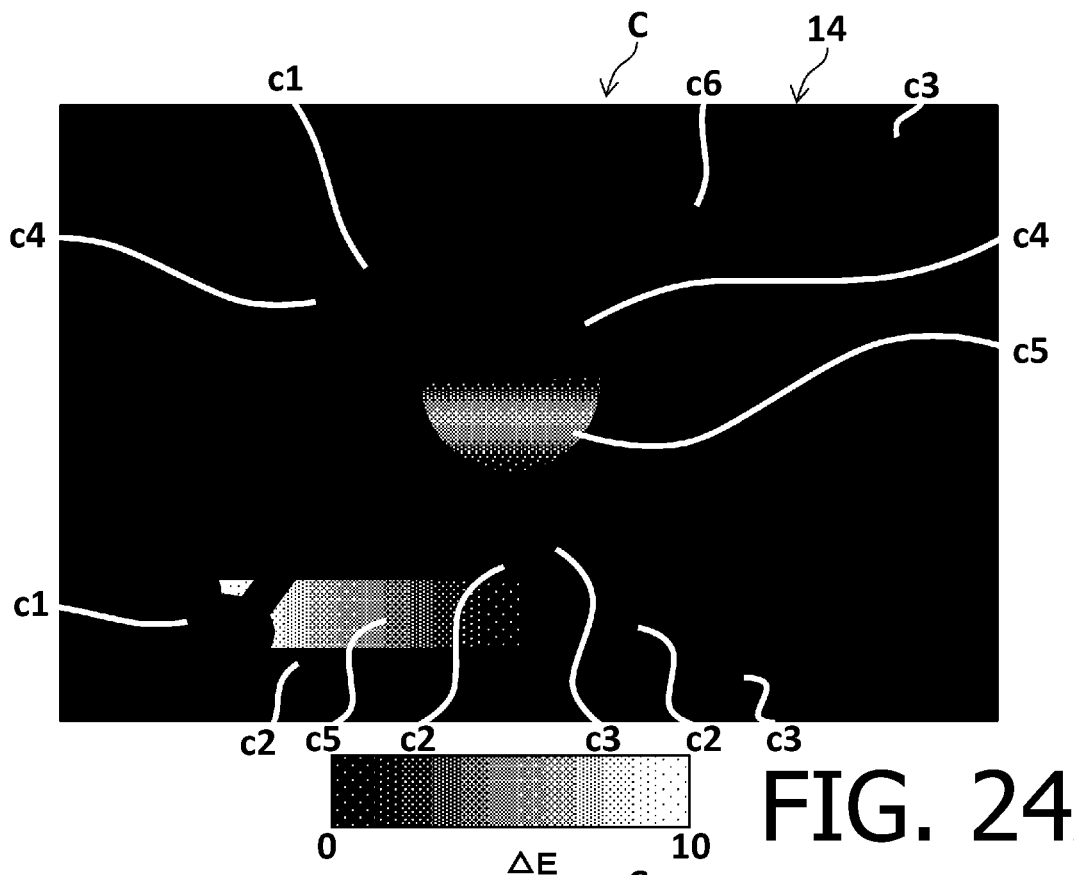
FIGS. 24A-24B illustrate images to be displayed in a sixth displaying operation in the controlling flow shown in FIG. 23.

In the example shown in FIG. 24A, the part c5 in the image C that corresponds to the color gamut d5 may be displayed in a color brighter than black. Meanwhile, the parts other than the part c5 in the image C may be displayed in black. In this arrangement, in which the color differences are expressed in the brightness, the user may recognize the color difference between the imaging color gamut D and the green printing color gamut Hg and may select the custom color from the option colors to improve reproducibility of the image C based on the recognition effectively. The image C may be displayed in a mode such that at least one of hue, brightness, and saturation thereof varies depending on largeness of the color difference.

Figure 24B:
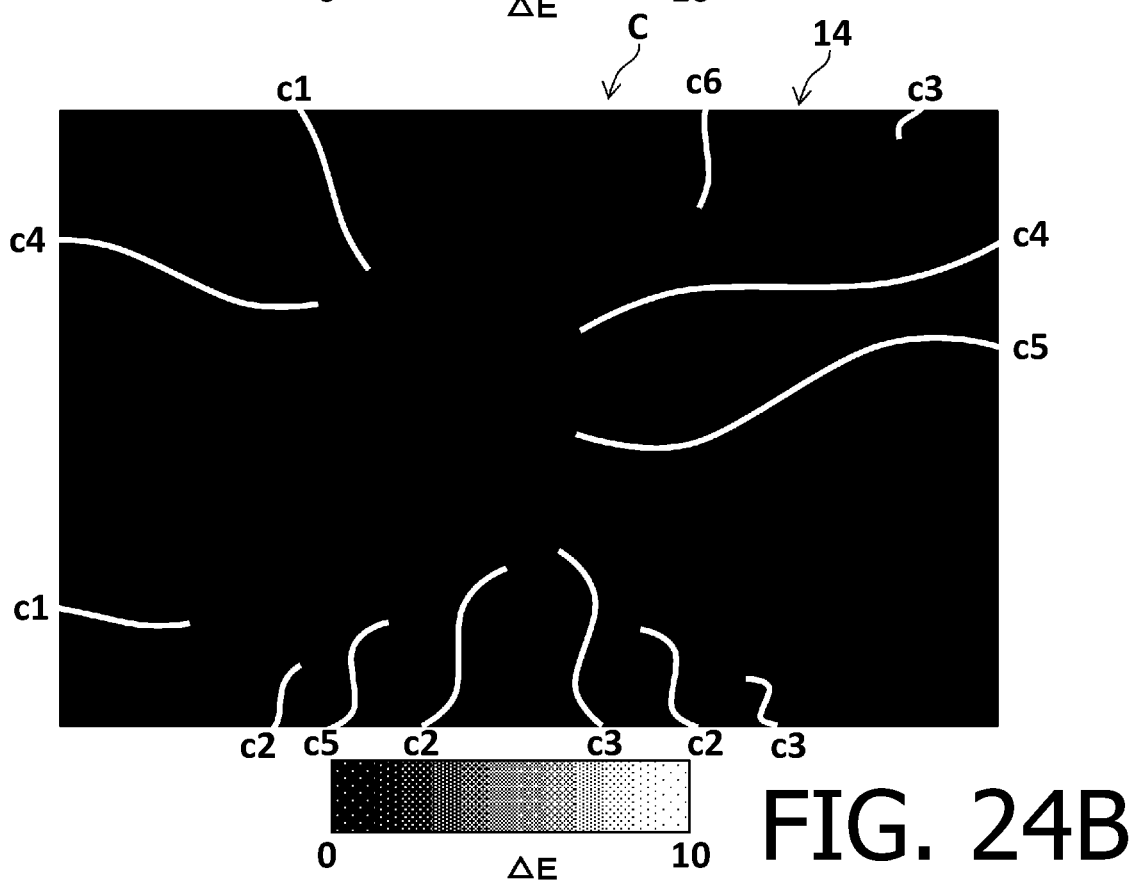

On the other hand, if the user's selection for the detail of the option color red is entered, the controller 50 may acquire a color difference between the imaging color gamut D acquired in the first acquiring operation in S2 and the red printing color gamut Hr acquired in the third acquiring operation in S3. The controller 50 may convert the imaging color values d in the imaging color gamut D into color values according to the acquired color difference. In the example shown in FIG. 9, the imaging color gamut D falls within the printing color gamut Hr, and $\Delta E=0$ may be acquired. Therefore, the controller 50 may convert the imaging color values d in the imaging color gamut D into a color value, of which brightness is lower, i.e., to the color value of black. The controller 50 may operate the display 14 to display the image C based on the image data, in which the imaging color values d are converted, as shown in FIG. 24B. In the example shown in FIG. 24B, the entire parts in the image C may be displayed in the plain color of black. Thus, the colors in the image C that fall within the printing color gamut Hr may be displayed in a plain color, which is different from the color to replace the color outside the printing color gamut Hr, the user observing the image C may recognize the color difference between the imaging color gamut D and the red printing color gamut Hr and may select the custom color from the option colors to improve reproducibility of the image C based on the recognition effectively.

Eighth Modified Example

In the printing apparatus 10 in an eighth modified example, which may be modified from the embodiment described earlier and the first through seventh modified examples, the controller 50 may execute a seventh displaying operation. In the seventh displaying operation, the controller 50 may operate the display 14 to display a patch chart P, in which patches p corresponding to the color values of the colors in the image C are arrayed on a plain. In the patch chart P, the patches p corresponding to the color values that do not fall within the printing color gamuts Hr, Hg are distinguished from patches p corresponding to the color values that fall within the printing color gamuts Hr, Hg.

Figure 25:
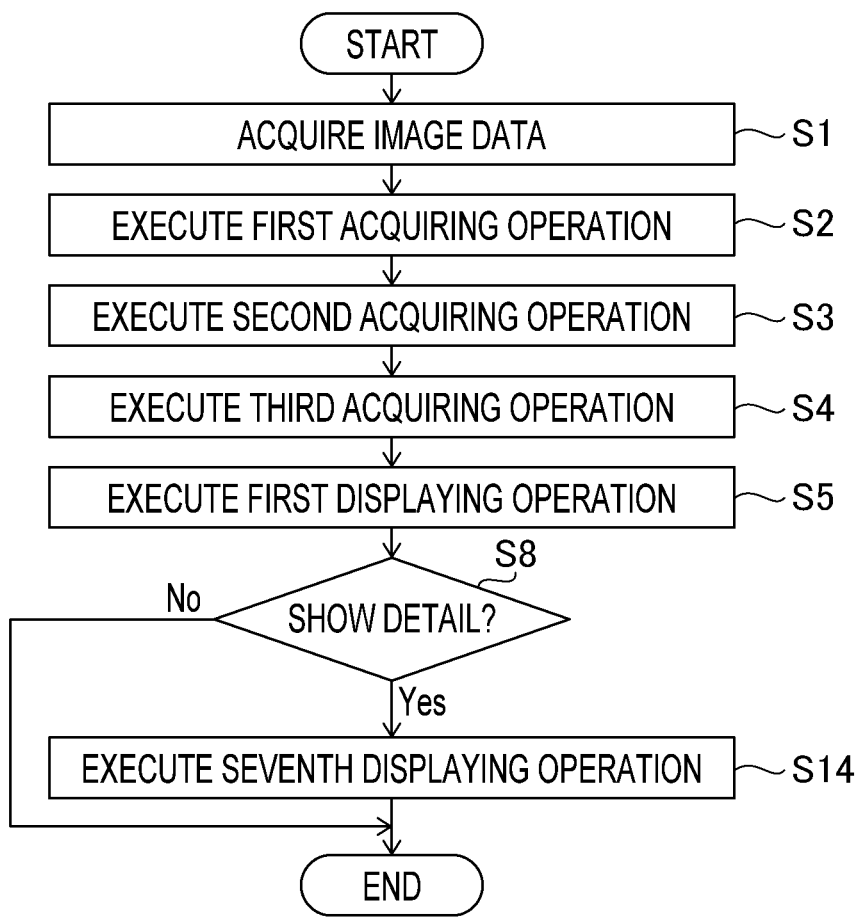
FIG. 25 is a flowchart to illustrate an eighth modified example of the controlling flow of steps to be executed in the printing apparatus.

For example, the printing apparatus 10 may be operated by the controller 50 according to a controlling flow as shown in FIG. 25. The flowchart shown in FIG. 25 has S14 in place of S9 in the flowchart shown in FIG. 17.

Figure 26A:
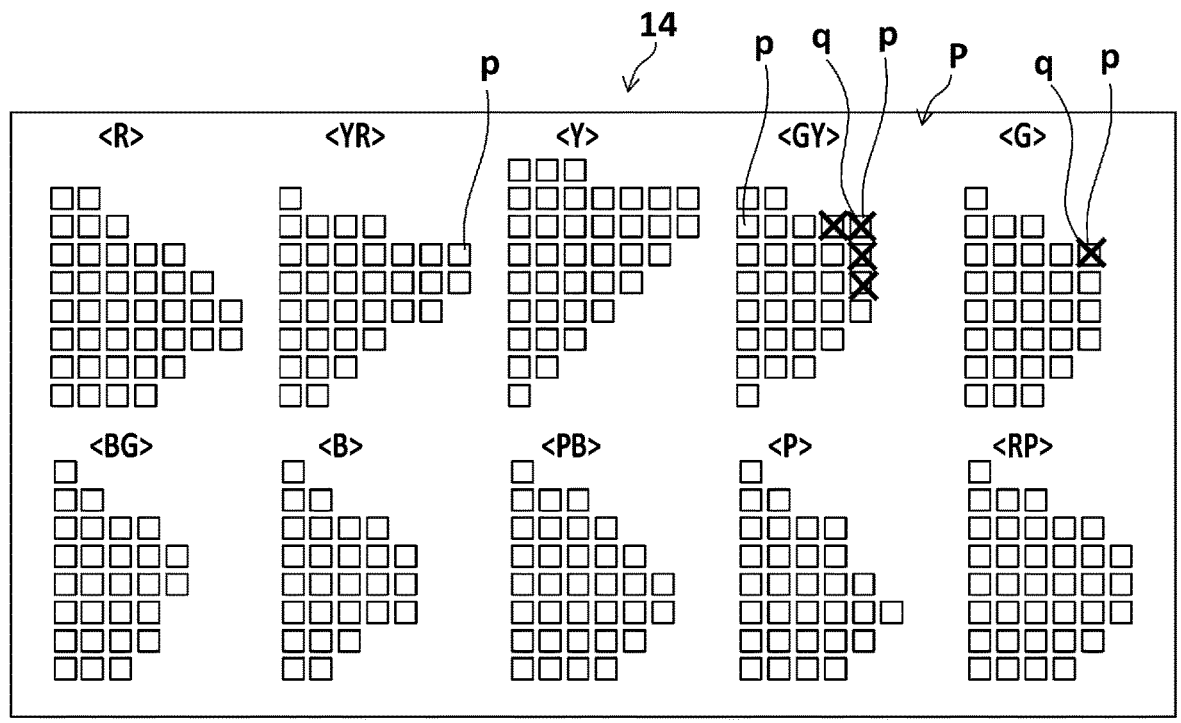
FIGS. 26A-26B illustrate images to be displayed in a seventh displaying operation in the controlling flow shown in FIG. 25.
Figure 26B:
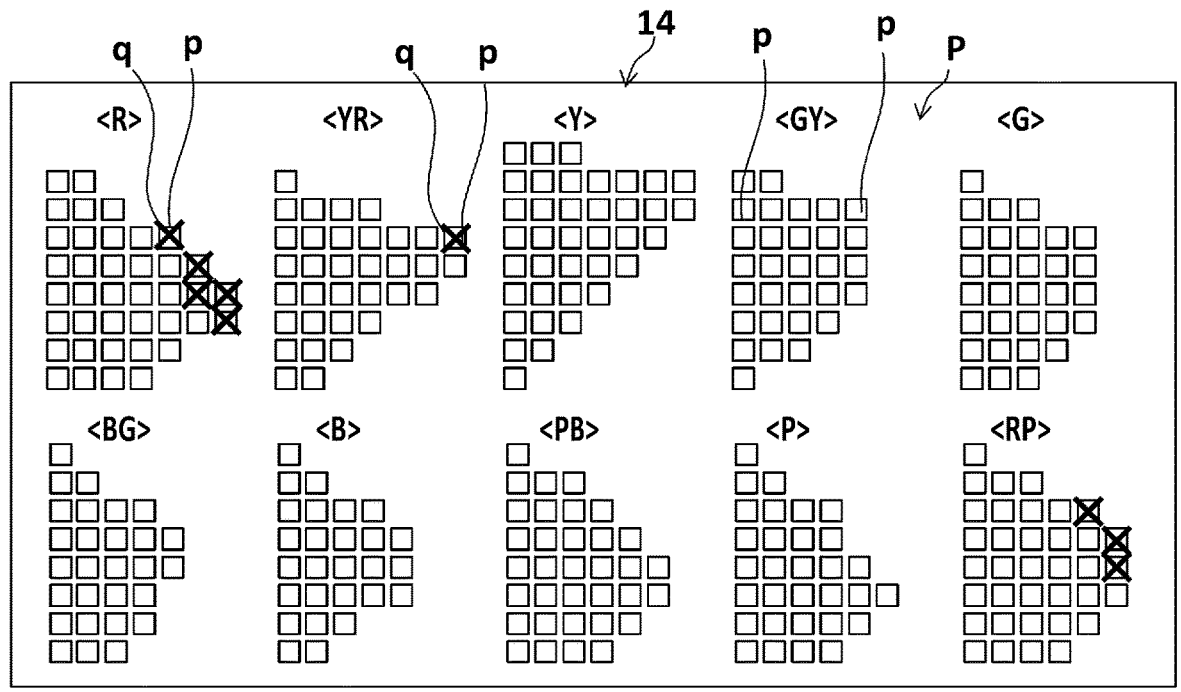

For example, when the user's selection for the detail of the option color is entered (S8: YES), the controller 50 may execute a seventh displaying operation (S14). If the user's selection for the detail of the option color red is entered, the controller 50 may determine whether each of the imaging color values d in the imaging color gamut D acquired in the first acquiring operation in S2 falls within the red printing color gamut Hr acquired in the second acquiring operation in S3. As shown in FIG. 26A, the controller 50 may operate the display 14 to display the patch chart P including the patches p for the imaging color values d and marks q indicating results of the determinations. Meanwhile, if the user's selection for the detail of the option color green is entered, the controller 50 may determine whether each of the imaging color values d in the imaging color gamut D acquired in the first acquiring operation in S2 falls within the green printing color gamut Hg acquired in the second acquiring operation in S3. As shown in FIG. 26B, the controller 50 may operate the display 14 to display the patch chart P including the patches p for the imaging color values d and marks q indicating results of the determinations.

Each patch p is a color indication having, for example, a square form. The patch chart P may include the patches p, of which number is equal to the number of the imaging color values d contained in the imaging color gamut D, and the patches p are arrayed on the same plane. The results of the determinations may be, for example, expressed in the marks q, such as "x" arranged on the patches p for the imaging color values d that do not fall within the printing color gamut Hr. The user may observe the chart of the imaging color values d included in the imaging color gamut D at a glance and recognize whether the imaging color values d fall within the printing color gamuts Hr, Hg through the marks q easily.

Thereby, the user observing the patch chart P may select the custom color from the option colors to improve reproducibility of the image C.

Ninth Modified Example

In the printing apparatus 10 in a ninth modified example, which may be modified from the embodiment described earlier and the first through eighth modified examples, the controller 50 may execute a color-compressing operation, in which the controller 50 converts the color values in the image C into the color values in the printing color gamuts Hr, Hg. Moreover, the controller 50 may execute an eighth displaying operation, in which the controller 50 operates the display 14 to display the image C based on the color values converted in the color-compressing operation.

Figure 27:
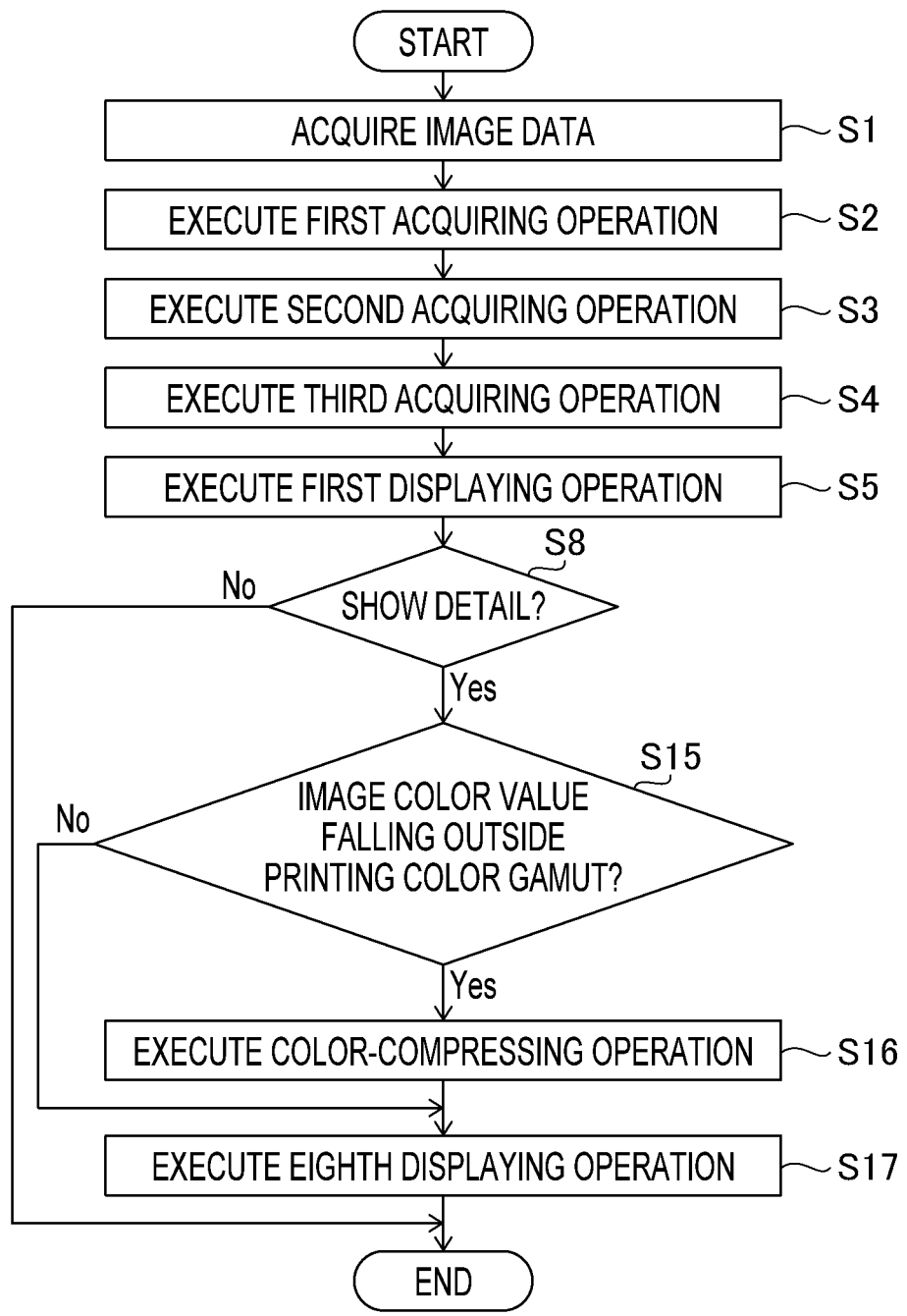
FIG. 27 is a flowchart to illustrate a ninth modified example of the controlling flow of steps to be executed in the printing apparatus.
Figure 28A:
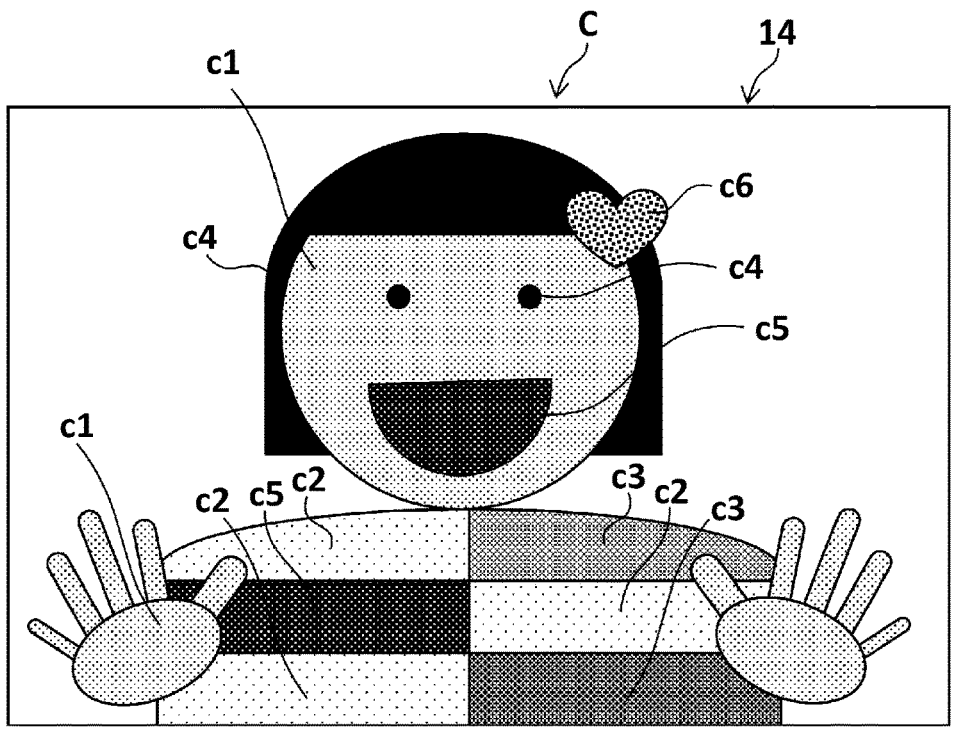
FIGS. 28A-28B illustrate images to be displayed in an eighth displaying operation in the controlling flow shown in FIG. 27.
Figure 28B:
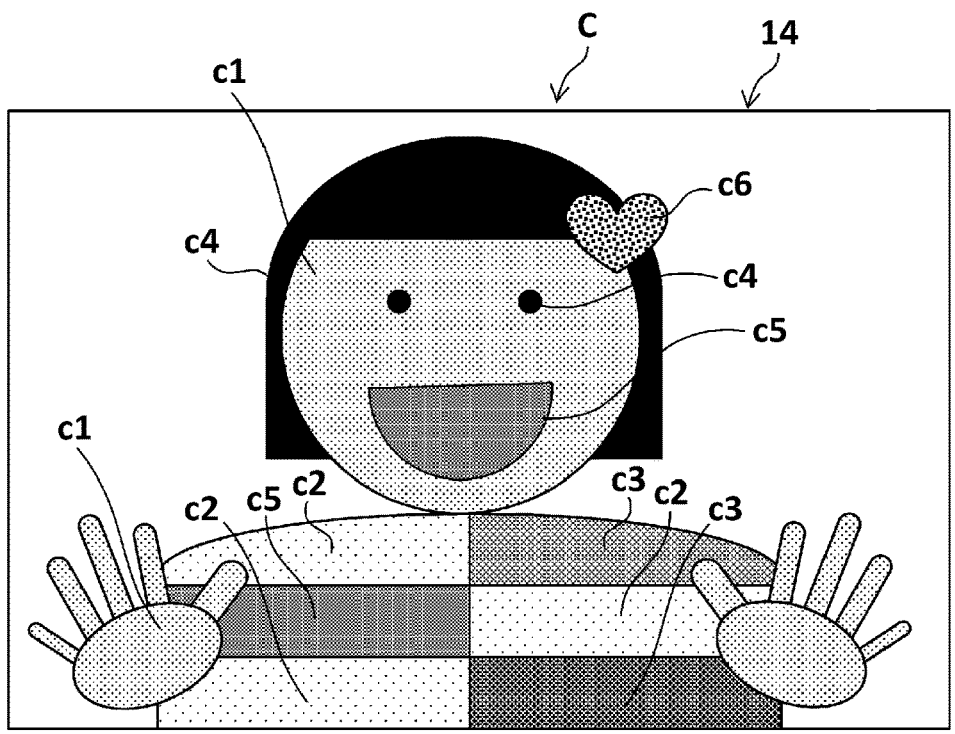
Figure 29:
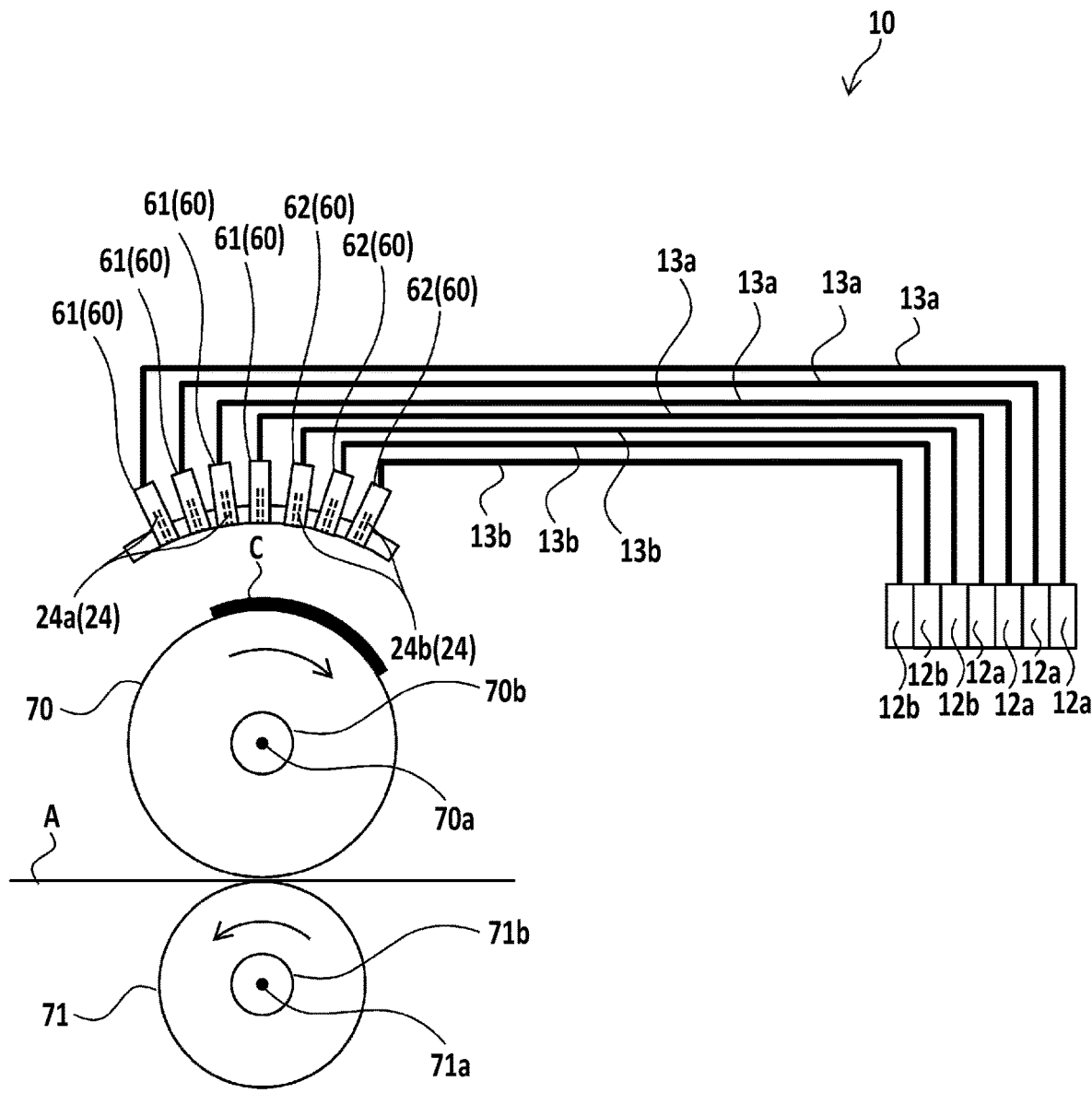
FIG. 29 is a schematic sideward view of the printing apparatus in a tenth modified example.

For example, the printing apparatus 10 may be operated by the controller 50 according to a controlling flow as shown in FIG. 27. The flowchart shown in FIG. 27 has S15-S17 in place of S9 in the flowchart shown in FIG. 17.

For example, when the user's selection for the detail of the option color is entered (S8: YES), the controller 50 may determine whether the imaging color gamut D has an imaging color value d that falls outside the printing color gamuts Hr, Hg (S15). If the user's selection for the detail of the option color red is entered, in S15, the controller 50 may determine whether any of the imaging color values d in the imaging color gamut D acquired in the first acquiring operation in S2 falls outside the red printing color gamut Hr acquired in the second acquiring operation in S3. In the example of FIG. 9, the entire imaging color values d in the imaging color gamut D fall within the printing color gamut Hr. Therefore, the controller 50 may determine that there is no imaging color value d in the imaging color gamut D that falls outside the printing color gamut Hr (S15: NO) and execute the eighth displaying operation (S17). In the eighth displaying operation, the controller 50 may operate the display 14 to display the image C based on the image data without converting the imaging color values d.

On the other hand, if the user's selection for the detail of the option color green is entered, in S15, the controller 50 may determine whether any of the imaging color values d in the imaging color gamut D acquired in the first acquiring operation in S2 falls outside the green printing color gamut Hg acquired in the second acquiring operation in S3. In the example of FIG. 10, the color gamut d5 in the imaging color gamut D falls outside the printing color gamut Hg while the other color gamuts fall within the printing color gamut Hg. Therefore, the controller 50 may determine that the imaging color gamut D includes the imaging color values d that fall outside the printing color gamut Hg (S15: YES) and execute the color-compressing operation to the imaging color value d (S16). The controller 50 may execute the color-compressing operation, such as gamut mapping, and convert the imaging color values d in the color gamut d5 into a color value to fall within the printing color gamut Hg. For example, in the color-compressing operation, the controller 50 may convert the imaging color value d in the color gamut d5 into one of the color values in the printing color gamut Hg at a closest distance from the imaging color value d in the L*a*b* color space. The converted color value may be an intersection between an outline of the printing color gamut Hg and a line drawn perpendicularly from the imaging color value d.

In S17, the controller 50 may execute the eighth displaying operation. In the eighth displaying operation, the controller 50 may operate the display 14 to display the image C based on the image data, in which the imaging color values d in the color gamut d5 are converted. Thereby, the part c5 in the image C, which corresponds to the color gamut d5 in the imaging color gamut D, may be displayed in a color different from the color based on the unconverted image data. Meanwhile, the parts in the image C other than the part c5 may be displayed in the colors based on the unconverted image data. Thus, the user may observe the image C, in the case where the user selects the option color of green as the custom color, and may select the custom color to improve reproducibility of the image C effectively based on the observation.

Tenth Modified Example

The printing apparatus 10 in a tenth modified example, which may be modified from the embodiment described earlier and the first through ninth modified examples, has a plurality of heads 60, and a transfer drum 70 and a pressure drum 71 that may work as a conveyer. The printing apparatus 10 may operate to discharge the ink from heads 60 at the transfer drum 70 to form the image C on the transfer drum 70 and transfer the image C onto the printing medium A.

The heads 60 may be line heads, each having the plurality of nozzles 24. The plurality of nozzles 24 are arrayed in a range longer than a printable range in the printing medium A in the widthwise direction. The nozzles 24 are formed through lower surfaces of the heads 60, and the lower surfaces of the heads 60 face a surface of the transfer drum 70. For example, the heads 60 may discharge inks of different types. The heads 60 may include, for example, four (4) first heads 61 and three (3) second heads 62. Each first head 61 is continuous with one of the first tanks 12a through the first flow path 13a and has the first nozzles 24a to discharge the ink in one of the basic colors. Each second head 62 is continuous with one of the second tanks 12b through the second flow path 13b and has the second nozzles 24b to discharge the ink in one of the custom colors which are different from the basic colors. When the second tank 12b is loaded with the ink in one of the custom colors selected from the option colors, the ink in the selected custom color may flow from the second tank 12b through the second flow path 13b and may be discharged through the second nozzles 24b.

The transfer drum 70 has a cylindrical form having a central axis 70a, which extends in the widthwise direction, and may rotate on the central axis 70a. The plurality of heads 60 are arranged radially from the central axis 70a of the transfer drum 70. The pressure drum 71 has a cylindrical form having a central axis 71a, which extends in the widthwise direction, and may rotate on the central axis 71a. The transfer drum 70 and the pressure drum 71 align in the vertical direction in an arrangement such that the printing medium A may be nipped between the transfer drum 70 and the pressure drum 71.

The transfer drum 70 is provided with a transfer motor 70b, and the pressure drum 71 is provided with a pressure-drum motor 71b. The transfer motor 70b and the pressure-drum motor 71b may be controlled to be driven by the controller 50 (see FIG. 3). The transfer drum 70 and the pressure drum 71 may convey the printing medium A in the front-rear direction by rotating in opposite directions from each other.

In a printing operation in the printing apparatus 10 according to the tenth modified example, the controller 50 may operate the transfer drum 70 and the pressure drum 71 to rotate to convey the printing medium A frontward and operate the first heads 21 and the second heads 22 to discharge the inks in the basic colors through the first nozzles 24a and the ink in the custom color from the second nozzles 24b, respectively, at the transfer drum 70. Thereby, the image C may be formed on the transfer drum 70. The image C on the transfer drum 70 may move as the transfer drum 70 rotates and may be pressed against the printing medium A at the position between the transfer drum 70 and the pressure drum 71. Thereby, the image C may be transferred from the transfer drum 70 and printed on the printing medium A.

More Examples

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiment of the disclosure, as set forth above, is intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

For example, with regard to the embodiment described earlier and the first through ninth modified examples, in place of the printing apparatus 10, a printing system having the plurality of heads 20, the platen 11, the plurality of tanks 12, the conveyer 30, the movable device 40, the display 14, the input device 15, and the controller 50 may be provided. In this arrangement, the plurality of heads 20, the platen 11, the plurality of tanks 12, the conveyer 30, and the movable device 40 may form a printer unit, and the display 14 and the input device 15 may be provided separately from the printer unit. The display 14 and the input device 15 provided separately from the printer unit may be provided to a computer. Optionally, the controller 50 may be provided to at least one of the printer unit and the computer.

For another example, with regard to the embodiment described earlier and the first through tenth modified examples, the third tanks 12c continuous with the third heads 23 through the third flow path 13c may not necessarily contain the ink for foundation. For example, the third tanks 12c may contain ink to be used in a post-printing process, and the ink may be supplied from the third tanks 12c through the third flow paths 13c to the third heads 23. The ink for post-printing process may be, for example, translucent ink that may apply glossy coating on the printed image C.

For another example, with regard to the embodiment described earlier and the first through tenth modified examples, the inks in the basic colors, the custom colors, and the foundation colors may not necessarily be supplied from the first tanks 12a through the first flow paths 13a to the first heads 21, from the second tanks 12b through the second flow paths 13b to the second heads 22, or from the third tanks 12c through the third flow paths 13c to the third heads 23, respectively. In other words, optionally, the inks in the basic colors, the inks in the custom colors, and the inks for the foundation colors may be supplied to the same heads 20. For example, the inks in the basic colors, the custom colors, and the foundation colors may be supplied to the same heads 20 from the first tanks 12a through the first flow paths 13a, from the second tanks 12b through the second flow paths 13b, and from the third tanks 12c through the third flow paths 13, respectively. For another example, in the arrangement that the inks in the basic colors, the custom colors, and the foundation colors are supplied to the same heads 20, the first heads 21, the second heads 22, and the third heads 23 may not necessarily be provided with the separate nozzle plates 27, but a single piece of nozzle plate 27 may be provided to the plurality of heads 20. The single piece of nozzle plate 27 may have the first nozzle lines 21a-21d, the second nozzle lines 22a-22d, and the third nozzle lines 23a-23d. Moreover, in the arrangement that the inks in the basic colors, the custom colors, and the foundation colors are supplied to the same heads 20, a number of nozzle lines in the second nozzle lines 22a-22b and/or the third nozzle lines 23a-23d may be reduced. For example, the second nozzle lines 22b-22d and the third nozzle lines 23b-23d may be omitted, and the second nozzle lines 22a and the third nozzle lines 23a alone may be provided.

For another example, in the embodiment described earlier and the first through tenth modified examples, the inks in the basic colors, the custom colors, and the foundation colors are supplied from the first tanks 12a through the first flow paths 13a to the first heads 21, from the second tanks 12b through the second flow paths 13b to the second heads 22, and from the third tanks 12c through the third flow paths 13c to the third heads 23, respectively, and the first heads 21, the second heads 22, and the third heads 23 are in the so-called off-carriage style having and the first flow paths 13a, the second flow paths 13b, and the third flow paths 13c which are rubber tubes or plastic tubes. However, optionally, the first heads 21, the second heads 22, and the third heads 23 may be in a so-called on-carriage style. In other words, the carriage 41 may have the first heads 21, the second heads 22, the third heads 23, the first tanks 12a, the second tanks 12b, and the third tanks 12c mounted thereon without having the flow paths formed of rubber tubes or plastic tubes. In the on-carriage style, the first flow paths 13a, the second flow paths 13b, and the third flow paths 13c may be formed of resin rather than rubber tubes or plastic tubes. For example, the heads 20 may be formed of blocks of laminated resin plates, and the first flow paths 13a, the second flow paths 13b, and the third flow paths 13c may be formed of through-holes and/or grooves formed in the blocks of laminated plates.

For another example, with regard to the embodiment described earlier and the first through tenth modified examples, the carriage 41 may not necessarily be equipped with all of the first heads 21, the second heads 22, and the third heads 23. For example, the carriage 41 may have the first heads 21 and the second heads 22 alone and omit the third heads 23.

For another example, with regard to the embodiment described earlier and the first through tenth modified examples, the carriage 41 may not necessarily be equipped with two (2) first heads 21, two (2) second heads 22, and two (2) third heads 23. For example, the carriage 41 may have a single first head 21, a single second head 22, and a single third head 23. For another example, the carriage 41 may have three or more first heads 21, three or more second heads 22, and three or more third heads 23.

For another example, with regard to the printing apparatus 10 in the ninth modified example, the patches p being the charts expressing the imaging color values d may not necessarily be provided in the form of squares but may be in another forms of polygons or circles.

For another example, with regard to the printing apparatus 10 in the ninth modified example, the results of the determinations may not necessarily be expressed in the form of "x" arranged on the patches p for the imaging color values d that do not fall within the printing color gamut Hr. For example, the imaging color values d falling within the printing color gamut Hr may be indicated by a different sign such as "O" arranged on the patches p.

For another example, with regard to the printing apparatus 10 in the tenth modified example, in place of the printing apparatus 10, a printing system having the plurality of heads 60, the platen 11, the plurality of tanks 12, the transfer drum 70, the pressure drum 71, the display 14, the input device 15, and the controller 50 may be provided. In this arrangement, the plurality of heads 60, the platen 11, the plurality of tanks 12, the transfer drum 70, and the pressure drum 71 may form a printer unit, and the display 14 and the input device 15 may be provided separately from the printer unit. The display 14 and the input device 15 provided separately from the printer unit may be provided to a computer. Optionally, the controller 50 may be provided to at least one of the printer unit and the computer.

The present disclosure is applicable to a printing apparatus, by which color calibration of an image may be improved, a method for controlling the printing apparatus, and a computer-readable storage medium for the printing apparatus.

What is claimed is:

1. A printing apparatus, comprising:
a head having first nozzles for printing an image based on image data in inks in basic colors on a printing medium and second nozzles for printing an image based on the image data in an ink in a custom color different from the basic colors on the printing medium;
first flow paths for supplying the inks in the basic colors to the first nozzles;
at least one second flow path for supplying the ink in the custom color to the second nozzles;
a display; and
a controller configured to:
acquire an imaging color gamut, the imaging color gamut being a gamut in a predetermined color space including color values included in the image data;
for each of a plurality of option colors, acquire a printing color gamut in the predetermined color space, the printing color gamut including color values of colors printable with the first nozzles and the second nozzles in the inks in the basic colors and the option color, one of the plurality of option colors being selectable as the custom color;
acquire an evaluation value for each of the plurality of option colors based on a comparison between the printing color gamut and the imaging color gamut; and
before loading the at least one second flow path with the ink in the custom color, display a ranked order of the plurality of option colors based on the evaluation values in the display.

2. The printing apparatus according to claim 1, wherein the imaging color gamut includes color values included in image data of a plurality of images.

3. The printing apparatus according to claim 1, wherein the evaluation value acquired for each of the plurality of option colors includes a ratio of an area of a part of the image corresponding to the imaging color gamut falling within the printing color gamut for the option color to a total area of the image.

4. The printing apparatus according to claim 1, wherein the evaluation value acquired for each of the plurality of option colors includes a ratio of a volume of the imaging color gamut falling within the printing color gamut for the option color to a volume of the imaging color gamut in the predetermined color space.

5. The printing apparatus according to claim 1, wherein the imaging color gamut includes a first color gamut, the first color gamut being a gamut in the predetermined color space including color values included in a first part of the image, the first part having a size equal to or greater than a predetermined size, a color difference between the color values in the first part and color values in a periphery of the first part being equal to or greater than a predetermined color difference,
the controller is configured to:
determine whether the first color gamut falls within the printing color gamut for each of the plurality of option colors, and
display a result of the determination along with the ranked order of the plurality of option colors in the display.

6. The printing apparatus according to claim 1, wherein the controller is configured to display the image in the display in an appearance such that a part of the image having color values falling within the imaging color gamut but not falling within the printing color gamut for the option color and another part of the image having color values falling within the imaging color gamut and within the printing color gamut for the option color are distinguished.

7. The printing apparatus according to claim 6, wherein the controller is configured to:
convert the color values falling within the imaging color gamut but not falling within the printing color gamut for the option color into another color value,
display the part of the image corresponding to the color values falling within the imaging color gamut but not falling within the printing color gamut for the option color based on the another color value in the display, and
display the another part of the image corresponding to the color values falling within the imaging color gamut and within the printing color gamut for the option color based on the color value without converting in the display.

8. The printing apparatus according to claim 1, further comprising an input device configured to designate a position in the display,
wherein the controller is configured to:
display the predetermined color space expressing the imaging color gamut in the display, and
display a color difference between a color value at a position in the predetermined color space corresponding to the position in the display designated through the input device and the printing color gamut for the option color in the display.

9. The printing apparatus according to claim 1, wherein the controller is configured to display labels at positions of outlines of the printing color gamut for the option color, the labels expressing that color differences between the printing color gamut and the imaging color gamut increases as the color values in the imaging color gamut are separated farther outward from the positions of the outlines by varying at least one of hue, brightness, and saturation in the display.

10. The printing apparatus according to claim 1, wherein the controller is configured to replace a color of a pixel in the image not falling within the printing color gamut for the option color with another color by changing at least one of hue, brightness, and saturation according to a color difference between the color value of the pixel and the printing color gamut and display the image with the replaced color in the display.

11. The printing apparatus according to claim 10, wherein the controller is configured to replace colors of pixels in the image falling within the printing color gamut for the option color with a plain color different from the another color and display the image with the replaced color and the another color in the display.

12. The printing apparatus according to claim 1, wherein the controller is configured to display a patch chart having patches arrayed on a plane in the display, each of the patches corresponding to one of the color values of colors included in the image, the patches in the patch chart being displayed in an arrangement such that a patch corresponding to a color value not falling within the printing color gamut for the option color is distinguished from patches corresponding to the color values falling within the printing color gamut.

13. The printing apparatus according to claim 1, wherein the controller is configured to:
convert the color values in the image data into another color value in the printing color gamut for the option color, and
display the image based on the converted another color value in the display.

14. A method for controlling a printing apparatus, the printing apparatus comprising a head having first nozzles for printing an image based on image data in inks in basic colors on a printing medium and second nozzles for printing an image based on the image data in an ink in a custom color different from the basic colors on the printing medium, first flow paths for supplying the inks in the basic colors to the first nozzles, at least one second flow path for supplying the ink in the custom color to the second nozzles, and a display, the method comprising:
acquiring an imaging color gamut, the imaging color gamut being a gamut in a predetermined color space including color values included in the image data;
for each of a plurality of option colors, acquiring a printing color gamut in the predetermined color space, the printing color gamut including color values of colors printable with the first nozzles and the second nozzles in the inks in the basic colors and the option color, one of the plurality of option colors being selectable as the custom color;
acquiring an evaluation value for each of the plurality of option colors based on a comparison between the printing color gamut and the imaging color gamut; and
before loading the at least one second flow path with the ink in the custom color, displaying a ranked order of the plurality of option colors based on the evaluation values in the display.

15. A non-transitory computer readable storage medium storing computer readable instructions that are executable by a computer configured to control a printing apparatus, the printing apparatus comprising a display and a head, the head having first nozzles for printing an image based on image data in inks in basic colors on a printing medium, second nozzles for printing an image based on the image data in an ink in a custom color different from the basic colors on the printing medium, first flow paths for supplying the inks in the basic colors to the first nozzles, and at least one second flow path for supplying the ink in the custom color to the second nozzles, the computer readable instructions, when executed by the computer, causing the computer to:

acquire an imaging color gamut, the imaging color gamut being a gamut in a predetermined color space including color values included in the image data;

for each of a plurality of option colors, acquire a printing color gamut in the predetermined color space, the printing color gamut including color values of colors printable with the first nozzles and the second nozzles in the inks in the basic colors and the option color, one of the plurality of option colors being selectable as the custom color;

acquire an evaluation value for each of the plurality of option colors based on a comparison between the printing color gamut and the imaging color gamut; and before loading the at least one second flow path with the ink in the custom color, display a ranked order of the plurality of option colors based on the evaluation values in the display.

* * * * *